US006372818B1

(12) United States Patent
Kimura et al.

(10) Patent No.: US 6,372,818 B1
(45) Date of Patent: Apr. 16, 2002

(54) WATER-BASED INK FOR INK-JET, AND INK-JET RECORDING METHOD AND INSTRUMENTS USING THE SAME

(75) Inventors: Isao Kimura, Kawasaki; Hiroyuki Maeda; Masako Shimomura, both of Yokohama; Hidemi Kubota, Komae, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/705,301

(22) Filed: Aug. 29, 1996

(30) Foreign Application Priority Data

Aug. 31, 1995 (JP) .............................................. 7-245134

(51) Int. Cl.⁷ ............................................... C09D 11/10
(52) U.S. Cl. ........................ 523/161; 524/529; 524/530; 260/DIG. 38; 106/31.27
(58) Field of Search .................... 523/161; 524/529, 524/530; 260/DIG. 38; 106/31.27; 347/100

(56) References Cited

U.S. PATENT DOCUMENTS

| 4,246,154 A | | 1/1981 | Yao .............................. 524/88 |
| 4,680,332 A | | 7/1987 | Hair et al. ................... 524/377 |
| 5,100,471 A | | 3/1992 | Winnik et al. .............. 523/216 |
| 5,184,148 A | | 2/1993 | Suga et al. .................. 347/100 |
| 5,354,369 A | | 10/1994 | Shimomura et al. ..... 106/31.43 |
| 5,439,515 A | | 8/1995 | Kurabayashi et al. .... 106/31.37 |
| 5,955,515 A | * | 9/1999 | Kimura et al. .............. 523/161 |

FOREIGN PATENT DOCUMENTS

| EP | 0584509 | 3/1994 |
| EP | 0618278 | 10/1994 |
| JP | 58-13675 | 1/1983 |
| JP | 62-181372 | 8/1987 |
| JP | 63-87279 | 4/1988 |
| JP | 1-272623 | 10/1989 |
| JP | 3-172362 | 7/1991 |
| JP | 3-240586 | 10/1991 |
| JP | 6-009848 | 1/1994 |
| JP | 6-49399 | 2/1994 |

OTHER PUBLICATIONS

"Thermal Sensitivity of Some N–Substituted Acrylamide Polymers and Their Gels", Ito, et al., Netsu–koka–sei Jushi (Thermosetting Resins), vol. 7, No. 2, pp. 14–20 (1986).

"Solution Properties of Poly(N–isopropylacrylamide)", Henskins, et al., J. Macromol. Sci.—Chem., vol. A2, No. 8, pp. 1441–1455, (1968).

M.D. Croucher and M.L. Hair, "Design Criteria and Future Directions in Inkjet Ink Technology", Ind. Eng. Chem. Res., 28, 1712–1718 (1989).

* cited by examiner

*Primary Examiner*—Blaine Copenheaver
*Assistant Examiner*—John J. Guarriello
(74) *Attorney, Agent, or Firm*—Fitzpatrick, Cella, Harper & Scinto

(57) ABSTRACT

Disclosed herein is a water-based ink for ink-jet, comprising a liquid composition containing a coloring material and a liquid medium, wherein the ink comprises a polymer exhibiting a heat-reversible type thickening property and a compound having a light-heat converting function, or a polymer which exhibits a heat-reversible type thickening property and has a moiety capable of undergoing light-heat conversion.

38 Claims, 6 Drawing Sheets

PRINTING DIRECTION →

1 DOT LINE / SPACE

WATER-BASED INK FOR INK-JET, AND INK-JET RECORDING METHOD AND INSTRUMENTS USING THE SAME

BACKGROUND OF THE INVENTION

1. Field of the Invention

The present invention relates to a water-based ink suitable for use in ink-jet recording in which an ink is ejected and flown as droplets from an ejection opening (orifice), and these ink droplets are applied to a surface of a recoding medium, thereby conducting recording, and an ink-jet recording method and instruments using such an ink, and particularly to an ink-jet ink capable of preventing occurrences of feathering and bleeding and forming images high in color strength, and an ink-jet recording method and instruments using such an ink. According to the present invention, additional mechanisms required to enhance a recording performance of the instruments are also simplified, so that increase in cost is effectively checked, and at the same time, energy saving can be achieved.

2. Related Background Art

Water-based inks have heretofore been principally used as ink-jet recording inks from the viewpoint of safety, odor and the like. There have been known inks in which one or more of various water-soluble dyes or pigments are used as coloring materials and dissolved or dispersed in water or a mixed solvent of water and a water-soluble organic solvent, and a humectant, a dye-dissolving aid, a mildewproofing agent and/or the like are added thereto as needed. For the past few years, ink-jet recording using such inks has conspicuously spread because it has such many advantages as the inks can be ejected in a proportion of several thousand droplets per second to conduct high-speed recording with ease, noise is scarcely produced, multi-color recording can be performed with ease, high-resolution recording can be effected, and recording can be conducted on plain paper.

With the development of low-cost and high-performance personal computers and the standardization of GUI environment in recent years, even image recording by printers or the like has been required to achieve high coloring, high quality, high fastness properties, high-resolution recording, high-speed recording and the like. In response to this requirement, various technical ideas that a coloring material component is left on the surface of paper as much as possible to increase the optical density of images to be formed, edges of printed dots are made sharp, and the occurrence of feathering, bleeding and the like is lessened are also being proposed in ink-jet recording.

As a first example thereof, Japanese Patent Application Laid-Open No. 58-13675 discloses a method of controlling an absorption and spreading of recording dots in and on paper by adding polyvinyl pyrrolidone to an ink. As a second example thereof, Japanese Patent Application Laid-Open No. 3-172362 discloses a method of controlling the absorption of an ink and the spreading of dots by adding a specific microemulsion to the ink.

As a third example in which a sol-gel transition phenomenon is applied to an ink, Japanese Patent Application Laid-Open Nos. 62-181372 and 1-272623, etc. each describe an ink which is in a gel state at room temperature, but turns to a sol state by heating. It is said that according to such an ink, a penetration of the ink into paper can be controlled because recording on a recording medium is conducted in a sol state, and the ink turns to a gel state by its cooling.

As a fourth example, Japanese Patent Application Laid-Open No. 6-49399 has recently disclosed an ink, to which a compound having reversibly and thermally gelling property is added, and which has a good coloring ability and a fixing ability, causes little feathering, provides prints excellent in shelf stability, and is also excellent in reliability, and an ink-jet recording method and instruments using such an ink. The technical background thereof is based on a phenomenon that when an aqueous solution of a specific water-soluble polymer is gradually heated, its water-solubility is lowered, and so the solution becomes cloudy (a temperature at which such a phenomenon occurs is called "clouding point").

Typical examples of the water-soluble polymer include poly(N-isopropylacrylamide), poly(vinyl methyl ether), polyethylene oxide and hydroxypropylcellulose. Since these polymers have a negative temperature coefficient as to solubility, they are in a state separated and deposited from a solution at a temperature not lower than the clouding point. In such a deposited state, hydrophobic microgel is formed, and a viscosity of the solution decreases. When recording is conducted on a recording medium in a deposited state, the viscosity of the solution returns to the initial viscosity, i.e., increases, owing to the temperature drop on the recording medium, and so the penetration of the ink can be prevented.

As a fifth example, M. Croucher et al. have indicated problems involved in the conventional homogeneous inks and moreover proposed, as a future ink for ink-jet, a heterogeneous ink making good use of a latex [M. D. Croucher and M. L. Hair; "Design Criteria and Future Directions in Inkjet Ink Technology", Ind. Eng. Chem. Res., 28, 1712–1718 (1989)].

U.S. Pat. No. 4,246,154 discloses an ink in which fine particles of a vinyl polymer are colored with a dye and anionically stabilized. U.S. Pat. No. 4,680,332 also discloses a heterogeneous ink in which a water-insoluble polymer containing an oil-soluble dye and combined with a nonionic stabilizer is dispersed in a liquid medium. Further, in U.S. Pat. No. 5,100,471, there has been proposed a water-based ink comprising a solvent and colored particles composed of a polymer core and a silica shell to which a dye has been bonded by covalent bonding. The patent describes this ink as having such features as it produces a brighter color on paper, is stable to temperature change, and provides images high in water fastness.

On the other hand, as a sixth example, it has been proposed in Japanese Patent Application Laid-Open No. 3-240586 to use, as a nonaqueous ink, an ink in which colored particles coated with a resin which swells with a dispersion medium are dispersed in kerosene or the like. In this proposal, it is said that the ink is effective in, particularly, prevention of image feathering and of clogging at an orifice for ejecting ink droplets.

As a seventh example, further, Japanese Patent Application Laid-Open No. 63-87279 discloses, as a recording means for permitting a provision of high-quality images free of any feathering irrespective of paper, an ink-jet recording method in which an ink applied to a recording medium is heated at a temperature (80 to 140° C.) higher than room temperature in such a manner that physical property values of the ink become the desired values depending upon the combination of the recording paper and the ink.

However, the above-described first and second examples of the prior art involve a problem of the fixing ability of the ink in that since the penetration into paper is prevented, the ink does not penetrate into the paper, but remains on the paper for a long time. A problem that color mixing (bleeding) between inks of different colors also arises.

The ink based on the sol-gel transition of the third example involves a problem that running behavior may arise due to changes in storage temperature of the resulting prints, and so staining by color mixing and transfer due to running of images occurs.

The ink containing the reversibly and thermally gelling compound of the fourth example is unfit for a recording method in which one pixel is recorded at a high speed in several tens of milliseconds or shorter like ink-jet recording because it uses a water-soluble cellulose ether, and so its viscosity increase is slow. If the ink is used in ink-jet recording, such a compound must be used in a low concentration because the upper limit of viscosity upon ejection of the ink is as low as at most 20 mpa·s. It is hence difficult to sufficiently achieve a thickening effect.

On the other hand, among the fifth example group, the ink in which a coloring material has been anionically stabilized involves a problem that a pH region in which the coloring material is stably dispersed is narrow, and a selection range of dyes is hence limited. In addition, it has a disadvantage that printed dots thereof are small in spreading on paper, and an optical density (OD) required is hence hard to achieve. With respect to a reduction of fixing time, which is required for high-speed recording, the ink has little effect because fixing depends on only evaporation and penetration like the conventional image-forming means.

According to another disperse ink comprising a polymer containing an oil-soluble dye and combined with a nonionic stabilizer, the range of selection of dyes can be widened. As with the above ink, however, this ink has little effect on the shortening of fixing time because fixing is based on a mechanism depending on evaporation and penetration. In addition, the ink is disadvantageous even from the viewpoint of color mixing (bleeding) between inks of different colors because it takes a lot of time for fixing between adjacent dots.

A disperse ink of the polymer core/silica shell structure is excellent in dispersion stability of a pigment, but does not provide a sufficient OD because the ink has no particular means for an aggregation of a coloring material on a surface of paper. In addition, the ink has little effect on a reduction of fixing time because fixing depends on evaporation and penetration. Therefore, the ink involves a problem that bleeding occurs.

As a problem common to the above three examples, may be mentioned a problem that a rub-off resistance of recorded images is poor because an adhesion of a coloring material to the surface of paper is not taken into consideration in such inks.

The sixth example in the prior art involves problems of odor, safety and the like because it uses kerosene as a dispersion medium.

In the seventh example, recording is effected by heating a surface of paper to at least 80° C. and making good use of changes of physical properties of the ink applied to paper by heat. Since the temperature of the ink is raised by secondary heating through paper, the method involves a problem that the quantity of heat required for a temperature rise is as great as 1 cal/g.°C. or higher, and so the method is not efficient. In addition, the method also involves a disadvantage that when the temperature must be raised to 100° C. or higher, a passageway for discharging steam generated must be provided, and so the apparatus used must be of a large size. Further, the method is accompanied by the problem that the ejecting ability of a recording head is deteriorated due to evaporation of water in the ink within an nozzle of the recording head caused by radiant heat from the paper heated, and viscosity increase consequent thereon.

To eject ink droplets, water-based inks, particularly ink-jet inks, are required to have such physical properties as a surface tension not greater than 20 dyn/cm (related to refilling speed), a viscosity within a range of from 1 to 20 mpa·s, a pH value of about 3 to 10, and a fixing time shorter than 20 seconds (it is better to be the shortest possible time).

Here, a transfer of ink to paper is considered. With respect to the transfer phenomenon of liquid to paper, the Lucas-Washburn equation has been generally known. Supposing an amount of the liquid transferred, a roughness index of the paper, an absorption coefficient, transferring time and wetting-starting time are V, Vr, Ka, T and Tw, respectively, in case the liquid is water, the amount V of the transferred liquid is represented by the equation $$V = Vr + Ka\sqrt{T - Tw} \quad (1).$$

In the equation (1), Ka is related to physical properties of both paper and ink and is represented by the equation $$Ka = \sqrt{r \cdot \gamma \cos\theta / 2\eta} \quad (2)$$

wherein r is a capillary radius of the paper fiber, γ is a surface tension of the liquid, θ is a contact angle, and η is a viscosity of the liquid.

It is understood from the equation (1) that in order to leave a coloring material on a surface of the paper, it is necessary to delay a penetration of the liquid, namely, make the Ka value small, as far as possible (the time of evaporation can be gained by making Ka small). It is understood from the equation (2) that it is only necessary that the surface tension γ, the viscosity η and the contact angle θ be made low, high and great, respectively, as physical properties of an ink required to do so. However, the physical properties of the ink-jet ink are variously limited as described previously. It is thus difficult to control Ka.

On the other hand, when a nonaqueous solvent, for example, ethanol, is used as the liquid, the wetting-starting time Tw in the equation (1) may be ignored. Therefore, fixing can be accelerated. However, the Ka value also becomes greater, and so a penetrating effect is increased, resulting in an image on which "feathering" occurs to a great extent. In addition, the term of cos θ in the equation (2) is determined by the combination of ink and paper. Therefore, whether the quality of images is good or poor depends on the kind of paper used. Namely, such an ink cannot satisfy paper nondependence.

It is considered that the above-mentioned problems may arise even on the conventional coloring material-dispersed inks so far as their image formation depends on penetration and evaporation.

SUMMARY OF THE INVENTION

It is accordingly an object of the present invention to provide an ink-jet ink which can solve the above problems involved in the prior art, in particular, can prevent occurrences of feathering and bleeding and form images high in color strength, and an ink-jet recording method and instruments using such an ink.

The above object can be achieved by the present invention described below.

According to the present invention, there is thus provided a water-based ink for ink-jet, comprising a liquid composition containing a coloring material and a liquid medium, wherein the ink comprises a polymer exhibiting a heat-reversible type thickening property and a compound having a light-heat converting function.

According to the present invention, there is also provided a water-based ink for ink-jet, comprising a liquid composition containing a coloring material and a liquid medium, wherein the ink comprises a polymer which exhibits heat-reversible type thickening property and has a moiety capable of undergoing light-heat conversion.

According to the present invention, there is further provided an ink-jet recording method comprising ejecting droplets of an ink, which comprises a coloring material and a liquid medium, out of an orifice of a recording head in accordance with recording signals to apply the droplets to a recording medium, thereby conducting recording, wherein said ink is any one of the inks described above.

According to the present invention, there is still further provided an ink-jet recording method comprising ejecting droplets of an ink, which comprises a coloring material and a liquid medium, out of an orifice of a recording head in accordance with recording signals to conduct recording on a recording medium, wherein said ink is any one of the inks described above, and the recording head is kept at a temperature not higher than a transition temperature of the ink during the recording.

According to the present invention, there is yet still further provided a recording unit comprising an ink container portion containing an ink therein and a recording head from which the ink is ejected in the form of ink droplets, wherein said ink is any one of the inks described above.

According to the present invention, there is yet still further provided an ink-jet recording apparatus comprising a recording unit equipped with an ink container portion containing an ink therein and a recording head from which the ink is ejected in the form of ink droplets, wherein said recording unit is the recording unit described above.

BRIEF DESCRIPTION OF THE DRAWINGS

FIG. 1B typically illustrates a state in which a coloring matter is being taken into the interior of a polymer chain.

DESCRIPTION OF THE PREFERRED EMBODIMENTS

The present inventors have considered that the above-described limitations in the prior art are attributable to the fact that an ink is always a homogeneous liquid composed of a coloring material and a solvent irrespective of temperature, and thus discovered an ink composed of the above constitution, in which the ink undergoes a change of state, which is triggered by temperature, so that the viscosity of the ink increases at a certain temperature or higher on a recording medium.

More specifically, such a change of state means a formation of a state that a polymer which is dissolved and dissociated with a low viscosity in an ink at room temperature undergoes association between its molecules when heated at a certain temperature (hereinafter referred to as transition temperature) or higher, so that a concentrated high-viscosity liquid is formed, and a coloring material combines with the polymer. When the ink of such a state is applied to a recording medium to conduct recording, a concentrated coloring material phase remains on a surface of the recording medium, while a dilute solvent phase penetrates into the recording medium. Such a change of state is caused by heating the ink from the outside. The present inventors have carried out a further extensive investigation with a view toward finding a method for minimizing the energy required to heat the ink, and consequently discovered a mechanism wherein only the polymer undergoes a change of state depending on temperature, and succeeded in putting it to practical use, thus leading to completion of the present invention.

The mechanism wherein only the polymer undergoes a change of state depending on temperature will hereinafter be described in detail.

When a heat-reversible type thickening polymer and a compound capable of absorbing light and converting it into heat are caused to coexist in an ink, or a moiety capable of absorbing light and converting it into heat is introduced into a part of the heat-reversible type thickening polymer, energy generated by irradiation of light such as visible rays is absorbed in the light-heat converting moiety when exposing the ink to the light, so that heat is generated in close vicinity of the polymer, whereby association between its molecules is induced to exhibit the above effect. As the polymer used herein, those capable of coordinating a dye molecule are preferred. If such a polymer has active oxygen in its molecule, better effect can be obtained. Also, a photosensitizing coloring matter is useful as the light-heat converting moiety with a coloring matter having a porphyrin ring being preferred.

Figure 1A:
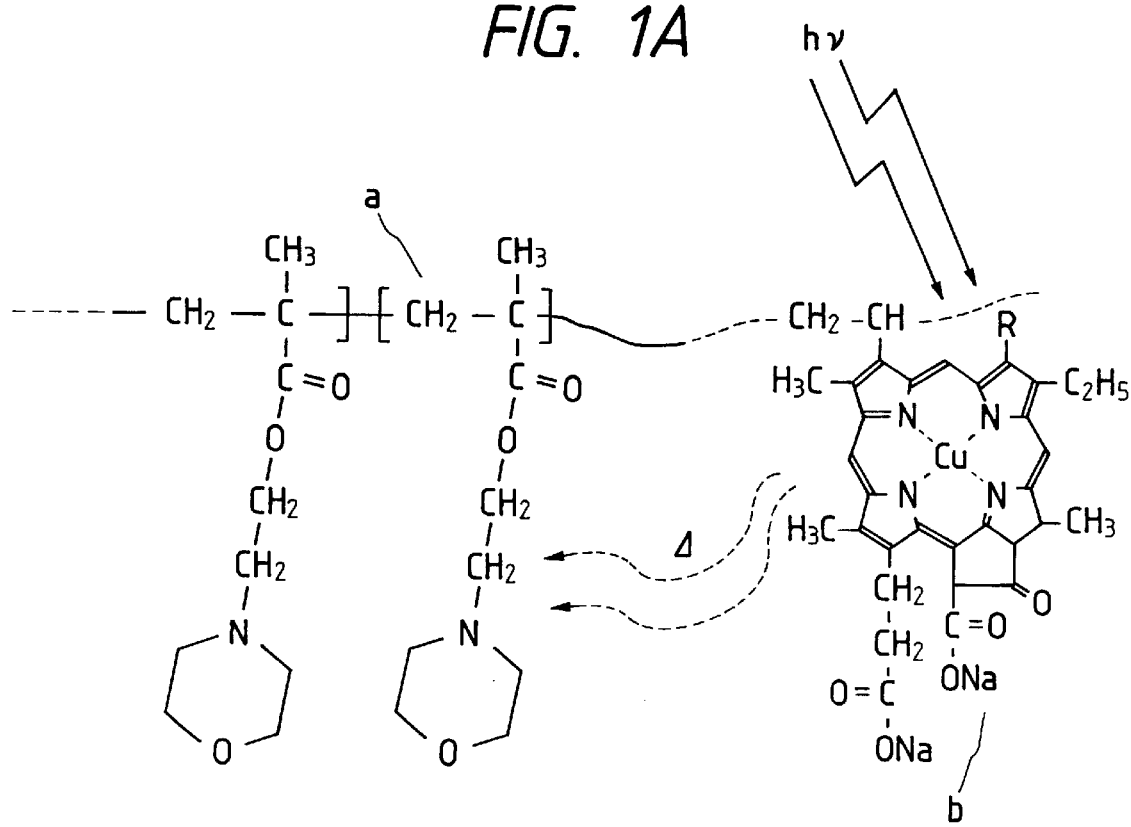
FIGS. 1A and 1B typically illustrate a change of state of an ink according to the present invention, which contains a heat-reversible type thickening polymer having a moiety capable of undergoing light-heat conversion by exposure to light.
Figure 1B:
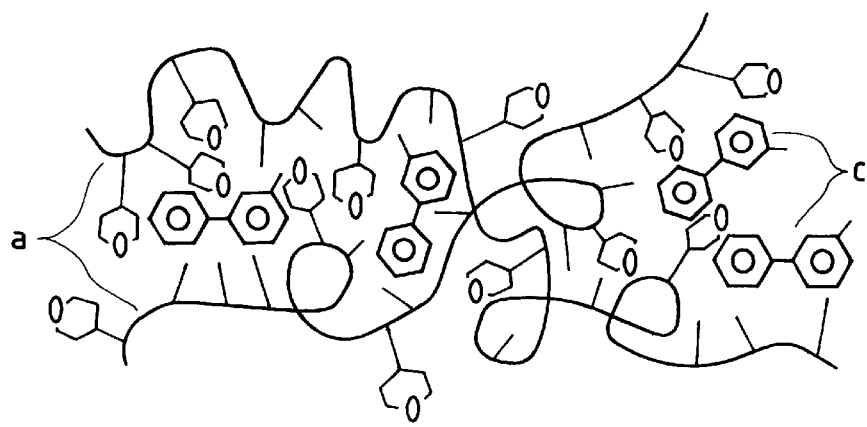

FIG. 1A conceptually illustrates a polymer having the above-described function, which is contained in the ink according to the present invention. In the drawing, reference character a is a polymer chain exhibiting a heat-reversible type thickening property, and reference character b is a photosensitizing coloring matter bonded to an end of the polymer chain a. Now, upon irradiation of visible rays having a wavelength of 500 nm, the photosensitizing coloring matter absorbs light energy hv and gives heat Δ to the polymer chain. As a result, the polymer chain starts thickening due to the heat Δ and undergoes association while a coloring material c is being taken in its interior, to form a concentrated high-viscosity liquid (FIG. 1B), thereby obtaining the above-described effect.

The present invention will hereinafter be described in more detail by preferred embodiments.

The heat-reversible type thickening polymer, which is used in the ink according to the present invention and dissolves and dissociates or associates and thickens at a certain transition temperature, will be first described.

The heat-reversible type thickening polymer means a polymer the aqueous solution or aqueous suspension of which thickens at a certain temperature (transition temperature) or higher, and the relationship between the temperature and viscosity of which is reversible.

Specific preferable examples of the above-described polymer useful in the practice of the present invention include water-soluble vinyl-type polymers (A) comprising at least 50% by weight of a vinylcarboxylic ester (a) of an alkylene oxide adduct of an active hydrogen compound having a nitrogen-containing ring as a constituent unit. More specifically, the polymers (A) include compounds in which the ester (a) is a (meth)acrylic ester of an adduct of (substituted) morpholine with 1 to 20 moles of ethylene oxide and/or propylene oxide.

Examples of the active hydrogen compound having a nitrogen-containing ring include compounds having a nitrogen-containing ring and at least one active hydrogen to which an alkylene oxide is added, and more specifically, nitrogen-containing alicyclic compounds, for example, compounds having an aziridine ring (aziridine, 2-methylaziridine, etc.), compounds having a pyrrolidine ring (pyrrolidine, 2-methylpyrrolidine, 2-pyrrolidone, succinimide, etc.), compounds having a piperidine ring (piperidine, 2-methylpiperidine, 3,5-dimethylpiperidine, 2-ethylpiperidine, 4-piperidinopiperidine, 4-pyrrolidinopiperidine, ethyl pipecolinate, etc.), compounds having a piperazine ring (1-methylpiperazine, 1-methyl-3-ethylpiperazine, etc.), compounds having a morpholine ring (morpholine, 2-methylmorpholine, 3,5-dimethylmorpholine, etc.), ε-caprolactam, nitrogen-containing unsaturated cyclic compounds (3-pyrroline, 2,5-dimethyl-3-pyrroline, 2-hydroxypyridine, 4-pyridylcarbinol, 2-hydroxypyrimidine, etc.), and the like.

Of these, the nitrogen-containing alicyclic compounds are preferred, the compounds having a piperidine ring are more preferred, and the compounds having a morpholine ring are most preferred.

In the present invention, ethylene oxide, propylene oxide and butylene oxide are preferred as the alkylene oxide.

A transition temperature of the heat-reversible type thickening polymer in the present invention may be controlled with ease by adjusting the kind of these alkylene oxides and the number of moles of the alkylene oxide to be added. In the case of, for example, ethylene oxide, the transition temperature becomes higher as the number of moles to be added increases. In the case of propylene oxide or butylene oxide, the transition temperature becomes lower as the number of moles of the alkylene oxide to be added increases. The number of moles of the alkylene oxide to be added is preferably of the order of from 1 to 20 moles, more preferably from 1 to 5 moles.

The vinylcarboxylic ester (a) of an alkylene oxide adduct of the active hydrogen compound having a nitrogen-containing ring is an ester of the alkylene oxide adduct as described above with a vinylcarboxylic acid. As the vinylcarboxylic acid, methacrylic acid, acrylic acid, maleic acid, vinylbenzoic acid and derivatives thereof are preferred with (meth)acrylic acid and derivatives thereof being particularly preferred.

The water-soluble vinyl polymer (A) in the present invention may be either a polymer composed of at least one of the esters (a) described above or a copolymer composed of at least one of the esters (a) and another vinyl-type monomer (b) so far as the polymer comprises, as a constituent unit, at least one ester (a) in an amount of at least 50% by weight.

Preferable examples of another vinyl-type monomer (b) used in this case include hydroxyethyl (meth)acrylate, polyethylene glycol mono(meth)acrylate, (meth)acrylamide, N-hydroxymethyl(meth)acrylamide, N-vinyl-2-pyrrolidone, (meth)acrylic acid, maleic acid (anhydride), styrenesulfonic acid, N,N-dimethylaminoethyl (meth)acrylate, N,N-diethylaminopropyl (meth)acrylate, methyl (meth)acrylate, butyl (meth)acrylate, glycidyl (meth)acrylate, N-butyl (meth)acrylamide, N-cyclohexyl(meth)acrylamide, (meth)acrylonitrile, styrene, vinyl acetate, vinyl chloride, butadiene and isoprene.

A temperature range of thickening varies according to the proportion occupied by the ester (a) among the monomers constituting the water-soluble vinyl-type polymer (A). In order to narrow the temperature range as far as possible, the ester (a) is preferably contained as a constituent unit in a proportion of at least 50% by weight, more preferably at least 70% by weight.

Other examples of the heat-reversible type thickening polymer useful in the practice of the present invention include polymers obtained by copolymerizing a monomer composition comprising at least 50% by weight in total of at least one of the vinylcarboxylic esters (a) of an alkylene oxide adduct of the active hydrogen compound having a nitrogen-containing ring, and at least one of monomers represented by the general formula (I)

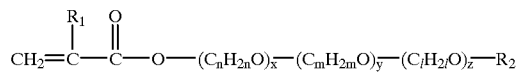

wherein $R_1$ is H or $CH_3$, $R_2$ is H, an alkyl group having 1 to 30 carbon atoms, an (alkyl)phenyl group or an (alkyl-substituted) aminoalkyl group, n is an integer of 2 to 4, m is an integer of 2 to 4, l is an integer of 2 to 4, x is an integer of 2 to 50, y is an integer of 0 to 50, and z is an integer of 0 to 50, with the proviso that n, m and l are not the same integers, and n and m, or m and l are not the same integers.

Examples of the monomer (I) include those having a structure that an alkylene oxide is added to a vinyl-type monomer. Specific examples thereof include ω-methoxypolyethylene glycol monoacrylate, ω-methoxypolyethylene glycol monomethacrylate, ω-ethoxypolyethylene glycol monoacrylate, ω-ethoxypolyethylene glycol monomethacrylate, ω-n-propylpolyethylene glycol monoacrylate, ω-n-propylpolyethylene glycol monomethacrylate, ω-iso-propylpolyethylene glycol monoacrylate, ω-iso-propylpolyethylene glycol monomethacrylate, ω-n-butylpolyethylene glycol monoacrylate, ω-n-butylpolyethylene glycol monomethacrylate, ω-iso-butylpolyethylene glycol monoacrylate, ω-iso-butylpolyethylene glycol monomethacrylate, ω-tert-butylpolyethylene glycol monoacrylate, ω-tert-butylpolyethylene glycol monomethacrylate, ω-phenoxypolyethylene glycol monoacrylate, ω-phenoxypolyethylene glycol monomethacrylate, (poly)propylene glycol-polyethylene glycol monoacrylate, (poly)propylene glycol-polyethylene glycol monomethacrylate, ω-methoxy(poly)propylene glycol-polyethylene glycol monoacrylate, ω-methoxy(poly)propylene glycol-polyethylene glycol monomethacrylate, (poly)butylene glycol-polyethylene glycol monoacrylate, (poly)butylene glycol-polyethylene glycol monomethacrylate, ω-methoxy (poly)butylene glycol-polyethylene glycol mono-acrylate, ω-methoxy(poly)butylene glycol-polyethylene glycol monomethacrylate, ω-methoxy(poly)ethylene glycol-(poly) propylene glycol-polyethylene glycol monoacrylate, ω-methoxy(poly)ethylene glycol-(poly)propylene glycol-polyethylene glycol monomethacrylate ω-hexyloxypolyethylene glycol mono(meth)acrylate, octa-decyloxypolyethylene glycol mono(meth)acrylate, ω-octylphenyl-(poly)ethylene glycol-polypropylene glycol mono(meth)acrylate, nonylphenyloxy(poly)ethylene glycol-(poly)propylene glycol-polyethylene glycol mono(meth) acrylate, polypropylene glycol mono(meth)acrylate, ω-methoxypolybutylene glycol mono(meth)acrylate, ω-methoxypoly-tetramethylene glycol mono(meth)acrylate and ω-dimethylaminoethylpolyethylene glycol mono(meth) acrylate.

As examples of a process for synthesizing the monomer above, may be mentioned (1) a process in which alkylene oxides (ethylene oxide, propylene oxide and butylene oxide) are successively added to methacrylic acid or acrylic acid in the presence of an alkali metal catalyst (sodium hydroxide, potassium hydroxide or the like) at 50 to 200° C. under 1 to 10 atm, and (2) a process in which alkylene oxides (ethylene oxide, propylene oxide and butylene oxide) are successively added to an alcohol having 1 to 4 carbon atoms or phenol in the presence of an alkali metal catalyst at 50 to 200° C. under 1 to 10 atm, and the resultant polyether monool is esterified with methacrylic acid or acrylic acid in the presence of an acid catalyst (sulfuric acid, p-toluenesulfonic acid or the like) at 50 to 200° C. under 1 to 10 atm, or reacted with an esterifying agent (dicyclohexylcarbodiimide or the like) at −10 to 50° C. under ordinary pressure.

In the present invention, water-soluble polymers having a clouding point may be used though their effect is similar to that of the above-described polymers. The term "water-soluble polymer having a clouding point" means a polymer exhibiting a phenomenon that when its aqueous solution is gradually heated, its water-solubility is lowered, and so the solution becomes cloudy (a temperature at which such a phenomenon occurs is called "clouding point"). Typical examples thereof include N-alkyl-substituted vinyl polymers [reference literature: Hiroshi Ito, Atsuhiko Nitta; "Netsu-koka-sei Jushi (Thermosetting Resins)", Vol. 7, No. 2, 14 (1986)]. In the present invention, a temperature at which an aqueous solution of a polymer undergoes a change of state is defined as "transition temperature". This transition temperature does not make it an essential condition that the aqueous solution becomes cloudy.

Specific examples of the water-soluble polymers having a clouding point include polymers of N-ethylacrylamide, N-cyclopropyl(meth)acrylamide, N-n-propyl(meth) acrylamide, N-tetrahydrofurylacrylamide, N-acryloylpyrrolidine, N-acryloylpiperidine, N-2-ethoxyethyl(meth)acrylamide, N-3-methoxypropyl(meth) acrylamide, N-3-ethoxypropyl(meth)-acrylamide, N-3-isopropoxypropyl-(meth)acrylamide, N-3-(2-methoxyethoxy)propyl(meth)acrylamide, N-1-methyl-2-methoxyethyl(meth)acrylamide, N-1-methoxymethylpropyl-(meth)acrylamide, N-methyl-N-ethylacrylamide, N-methyl-N-isopropylacrylamide, N-methyl-N-n-propylacrylamide, N,N-diethylacrylamide, N-(2,2-dimethoxyethyl)-N-methyl-acrylamide, N-(1,3-dioxolan-2-yl-methyl)-N-methyl-acrylamide, N-8-acryloyl-1,4-dioxa-8-azaspiro[4,5]decane, N-2-methoxyethyl-N-ethylacrylamide, N-2-methoxyethyl-N-n-propylacrylamide, N-2-methoxyethyl-N-isopropylacrylamide, N,N-bis(2-methoxyethyl)acrylamide, methyl vinyl ether, 2-(2-methoxyethoxy)ethyl vinyl ether, 2-methyl-5-vinylpyridine, N-vinylpyrrolidone, ethylene oxide and the like.

Since the transition temperature of the heat-reversible type thickening polymer varies according to the kinds and amounts of additive components, such as salts, surfactants and solvents, in the ink, it is necessary to adopt a transition temperature in an ink composition to be applied.

Compounds having a light-heat converting function (hereinafter referred to as "light-heat converting compound") used in the present invention will now be described.

The light-heat converting compounds are a series of compounds which are capable of converting light energy absorbed into heat and transmitting the heat to a substrate or the like. In general, they include indigo-type photosensitizing coloring matters, porphyrin-type photosensitizing coloring matters, xanthene-type photosensitizing coloring matters, thiazine-type photosensitizing coloring matters, chlorophyll-type photosensitizing coloring matters and quinone-type photosensitizing coloring matters. Of these, the porphyrin-type and chlorophyll-type coloring matters each exhibit absorption at a wavelength within a visible region and are hence capable of undergoing light-heat conversion by a primary light source such as an argon laser (wavelength: 488 nm), halogen lamp, fluorescent lamp or xenon lamp.

The structures of the photosensitizing coloring matters having a porphyrin ring and sodium copper chlorophyllin are given below.

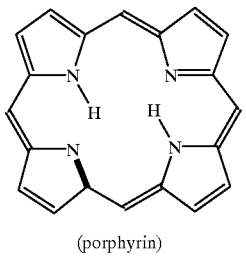

(porphyrin)

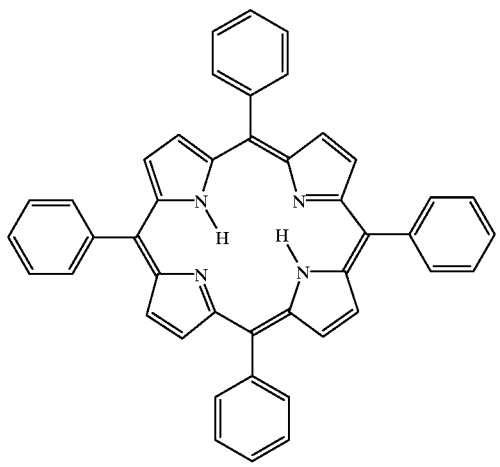

(tetraphenylporphyrin)

-continued

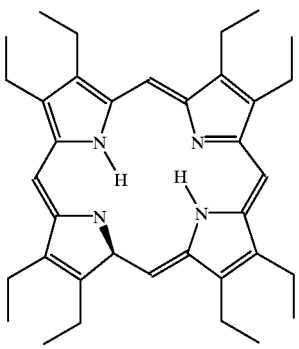

(octaethylporphyrin)

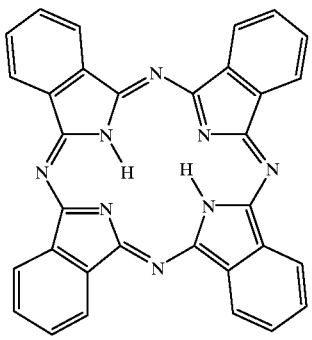

(phthalocyanine)

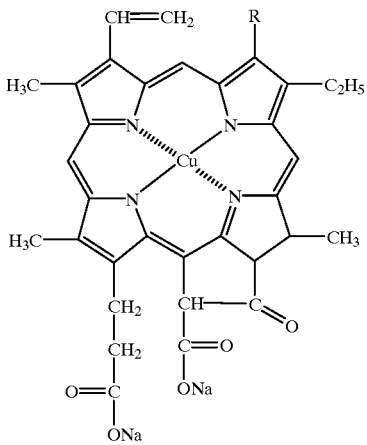

$\begin{pmatrix} \text{copper chlorophyllin a sodium salt R: } CH_3 \\ \text{copper chlorophyllin b sodium salt R: CHO} \end{pmatrix}$.

When the heat-reversible type thickening polymer and the light-heat converting compound as described above are separately dissolved in water, both aqueous solutions are mixed in advance, and the mixed aqueous solution is exposed to light, the polymer comes to exhibit a heat-reversible type thickening property owing to heat generated by the light-heat converting compound. It is more preferable to combine the polymer with the photosensitizing coloring matter because heat generated by the light-heat conversion is efficiently transmitted to the polymer chain situated at an extremely short distance therefrom, so that irradiating light energy may be less, thereby obtaining a further advantage.

The quantity of heat required for the change of state of the polymer is considered to be about 0.1 cal/g for a 1% aqueous solution of the polymer [reference literature: M. Henskins, J. E. Guillet; J. Macromol. Sci. Chem., A2, 1441 (1968)]. On the other hand, regarding the change of state by heating from the outside, a quantity of heat of about 30 cal/g is necessary for heating the recording medium, for example, from room temperature to 60° C. Therefore, the light-heat conversion method according to the present invention is considered to be very high in energy efficiency.

Description is then given as to coloring materials used in the inks according to the present invention. Examples of coloring materials usable in the present invention include dyes, carbon black or organic pigments, fine coloring material particles, in which a dye is bonded to surfaces of fine particles to make the dye water-insoluble, and fine coloring material particles, in which a dye is chemically bonded to organic fine particles of a core/shell structure having a reactive group on the surface of the shell.

First of all, the dye usable as a coloring material in the present invention may be any dye so far as it undergoes interaction with the heat-reversible type thickening polymer used in the present invention to accelerate the association of polymer chains. Examples thereof include direct dyes, acid dyes, food colors, basic dyes and reactive dyes. Most of them have a hydrophobic dye skeleton, a few solubilizing groups such as sulfonates ($-SO_3M$), carboxylates ($-COOM$) and/or ammonium salts ($NH_4X$), and a few hydrogen-bonding hydroxyl groups ($-OH$), amino groups ($-NH_2$) and/or imino groups ($-NH-$), and can form complexes with the heat-reversible type thickening polymer used in the present invention. Disperse dyes themselves are water-insoluble. However, since they are used in combination with a polycyclic anionic activator such as a naphthalenesulfonate, the apparent ionicity of the disperse dyes is anionic like the direct dyes, and such dyes may hence be used like the other dyes.

Specific examples of the above dyes include black dyes such as C.I. Direct Black 17, C.I. Direct Black 19, C.I. Direct Black 62, C.I. Direct Black 154, C.I. Food Black 2, C.I. Reactive Black 5, C.I. Acid Black 52 and I.C.I. Projet Fast Black 2; yellow dyes such as C.I. Direct Yellow 11, C.I. Direct Yellow 44, C.I. Direct Yellow 86, C.I. Direct Yellow 142, C.I. Direct Yellow 330, C.I. Acid Yellow 3, C.I. Acid Yellow 38, C.I. Basic Yellow 11, C.I. Basic Yellow 51, C.I. Disperse Yellow 3, C.I. Disperse Yellow 5 and C.I. Reactive Yellow 2; magenta dyes such as C.I. Direct Red 227, C.I. Direct Red 23, C.I. Acid Red 18, C.I. Acid Red 52, C.I. Basic Red 14, C.I. Basic Red 39 and C.I. Disperse Red 60; and cyan dyes such as C.I. Direct Blue 15, C.I. Direct Blue 199, C.I. Direct Blue 168, C.I. Acid Blue 9, C.I. Acid Blue 40, C.I. Basic Blue 41, C.I. Acid Blue 74 and C.I. Reactive Blue 5.

Besides these dyes, all dyes improved in water fastness by reducing the number of the solubilizing groups, dyes of special grade, in which their solubility is made sensitive to pH, and the like may be used in the present invention. The concentration of the dye in the ink may be freely selected within limits of its solubility. In general, it is preferably from 1 to 8% by weight. It is preferably from 3 to 10% by weight in the case where the resulting ink is used in recording on cloths, metals (anodized aluminum) and the like. Further, it is preferably from 0.01 to 10% by weight in the case where varied optical densities must be imparted to the resulting recorded image.

As second coloring materials, carbon black and organic pigments may be used. Since these coloring materials are used in combination with a dispersant similar to a case of the disperse dyes above, they may undergo interaction with the polymeric compound according to the present invention through the dispersant. As such a pigment, any pigment may be used so far as it is fit for ink-jet recording. In particular, as carbon black used in a black ink, it is desirable to use those produced in accordance with the furnace process or channel process and having such properties that a primary particle diameter is from 10 to 40 nm, a specific surface area is from 50 to 300 m$^2$/g as determined in accordance with the BET method, and an oil absorption is from 40 to 150 ml/100 g as determined by using DBP.

Examples of the carbon black include No. 2300, No. 900, MCF 88, No. 33, No. 40, No. 45, No. 52, MA 7, MA 8 and #2200B (all, products of Mitsubishi Kagaku Co., Ltd.); Raven 1255 and Raven 1060 (both, products of Columbian Carbon Japan Limited); Regal 330R, Regal 660R and Mogul L (all, products of Cabot Company); Color Black FW 18, Printex 35 and Printex U (all, products of Degussa Company); and those obtained by subjecting the surfaces of these carbon black products to an oxidizing treatment or plasma treatment. Besides, organic pigments such as insoluble azo dyes, soluble azo dyes, phthalocyanine-type pigments, high-grade isoindolinone-type pigments, high-grade quinacridone-type pigments, dioxane violet and high-grade perinone-type and perylene-type pigments may be used.

As coloring materials classified in the above pigments, so-called color lakes in which an extender pigment is dyed with a dye may also be used in the present invention.

As third coloring materials usable in the present invention, may be mentioned fine colored material particles in which a dye is bonded to the surfaces of fine particles to make the dye insoluble. The fine colored particles, which will be described herein, are those in which a dye is chemically bonded to organic fine particles of a core/shell structure having a reactive group on the surface of the shell. Preferable examples thereof include those having a reactive group selected from the group consisting of a carboxyl group, a hydroxyl group, an amino group, an epoxide group, an amide group, a hydroxymethyl group and an isocyanate group.

As a core in the core/shell type fine particles, there is used a styrene-divinylbenzene polymer having a high degree of crosslinking, into the surface of which the above-described reactive group is introduced. A thickness of shell is preferably adjusted to about 30% of the diameter of the fine particle so as to be fully dyed with a dye. More specifically, a fine particle dispersion S2467 (product of Japan Synthetic Rubber Co., Ltd.) is preferred. In order to use the dispersion S2467 as a coloring material, that having a particle diameter of from 10 to 80 nm and a solid content of 10% by weight as its properties is selected. That obtained by subjecting this fine particle shell to a surface modification with an amino group forms an ionic bond with, for example, a dye having an anionic dye ion, such as, a direct dye, and so the shell can be easily dyed with such a dye. On the other hand, when the fine particle shell is modified with a carboxyl group, the modified shell forms an ionic bond with a dye having a cationic dye ion, such as, a basic dye, and so the shell can be dyed.

The fine colored particles after the dyeing may be used as coloring materials for the inks according to the present invention by treating them in the same manner as in the pigments described above. The use of such a coloring material improves the thickening effect similar to a case of an addition of the dispersion of the fine particles. In addition, the coloring material is improved in water fastness compared with the case where only a dye is used, and so the fastness properties of the resulting recorded images may be enhanced.

Incidentally, these three kinds of coloring materials, which have been described above, may be used singly. However, it goes without saying that the combined use of the fine colored particles with the dye, or of the fine colored particles with the carbon black or the organic pigment is advantageous to a further improvement in the quality of the resulting recorded images in that higher color strength can be achieved owing to the enhancement of the thickening effect, and edges of recorded dots are made sharper owing to the inclusion of the particles.

The inks according to the present invention, in which the heat-reversible type thickening polymer and the coloring material as described above are contained in a liquid medium, may contain such humectants and dissolving aids as mentioned below with a view toward further imparting suitability for ink-jet such as reliability, storage stability or the adjustment of penetrating ability of ink.

Examples of such materials include alkylene glycols such as 1,2-ethanediol, 1,2-propanediol, 1,3-propanediol, 1,2-butanediol, 1,3-butanediol, 1,4-butanediol, 2,3-butanediol, 1,5-pentanediol, 1,7-heptanediol, 2-methyl-2,4-pentanediol, 2-ethyl-1,3-hexanediol, diethylene glycol, triethylene glycol, tetraethylene glycol, polyethylene glycol 200, dipropylene glycol and 2,2'-thiodiethanol; glycerol and 1,2,6-hexanetriol; alcohol amines such as monoethanolamine, diethanolamine and triethanolamine; aprotic polar solvents such as dimethylformamide, dimethylacetoamide, dimethyl sulfoxide, sulfolane and 1,3-propane sulfone; lower alkyl ethers of polyhydric alcohols, such as 1,2-dimethoxyethane, 1,2-diethoxyethane, 1,2-dibutoxyethane, diethylene glycol dimethyl ether, diethylene glycol diethyl ether, diethylene glycol dibutyl ether, 2-methoxyethanol, 2-ethoxyethanol, 2-(methoxymethoxy)ethanol, 2-butoxyethanol, diethylene glycol monomethyl ether, diethylene glycol monoethyl ether, diethylene glycol monobutyl ether, triethylene glycol monomethyl ether, 1-methoxy-2-propanol, 1-ethoxy-2-propanol, dipropylene glycol, dipropylene glycol monomethyl ether, dipropylene glycol monoethyl ether and tripropylene glycol monomethyl ether; formamide; 2-pyrrolidone; N-methyl-2-pyrrolidone; 1,3-dimethylimidazolidinone; sorbitol; sorbite; urea; and 1,3-bis(β-hydroxyethyl)urea. These compounds are preferably contained in the ink in a range of from 1 to 30% by weight based on the total weight of the ink.

When an alkyl alcohol such as methanol, ethanol, propanol, 2-propanol, 1-butanol or 2-butanol is contained in the ink according to the present invention upon using such an ink in ink-jet recording, its ejection properties are improved. Such an ink is hence more effective. These alcohols are preferably contained in an amount ranging from 1 to 10% by weight based on the total weight of the ink.

As necessary, the inks according to the present invention may further contain additives such as surfactants, rust preventives, mildewproofing agents, antioxidants and pH adjustors.

As described above, the inks according to the present invention are effective upon use in ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks according to the present invention are particularly suitably for use in these recording methods.

Figure 2:
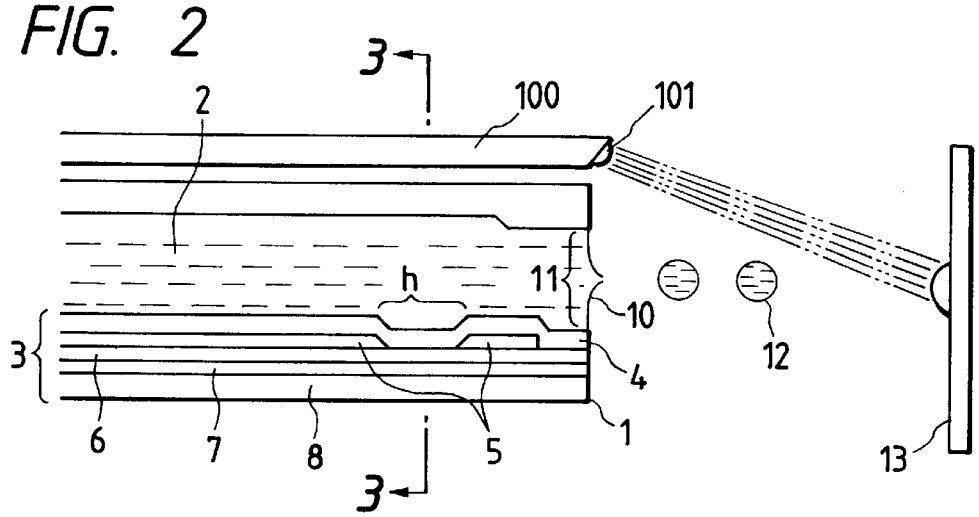
FIG. 2 is a longitudinal cross-sectional view of a head of an ink-jet recording apparatus to which an irradiating mechanism has been added.
Figure 3:
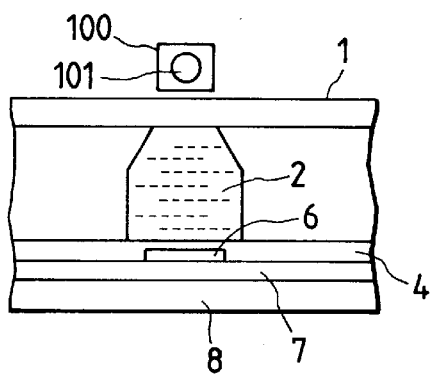
FIG. 3 is a transverse cross-sectional view of the head of the ink-jet recording apparatus shown in FIG. 2.
Figure 4:
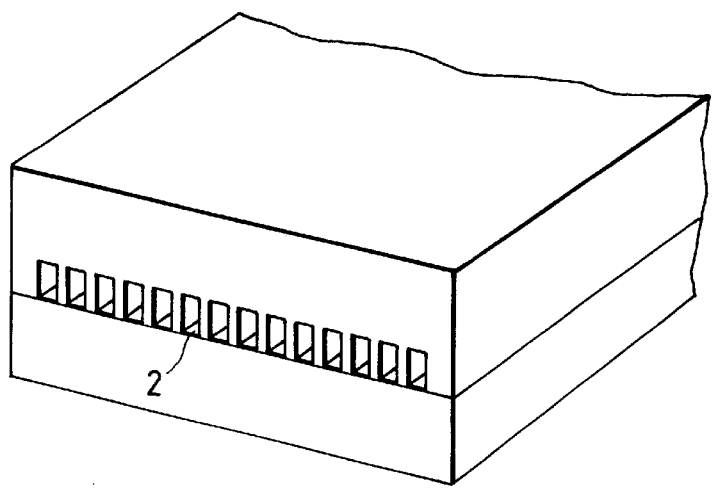
FIG. 4 is a perspective view illustrating an appearance of an exemplary head of an ink-jet recording apparatus, which is equipped with a plurality of nozzles.

Examples of the construction of an head, which is a main component of an apparatus using thermal energy as an ink-jet recording apparatus, are illustrated in FIGS. 2, 3 and 4.

A head 1 is formed by bonding a glass, ceramic, silicon or plastic plate or the like having a flow path (nozzle) 2 through which an ink is passed, to a heating element base 3. The heating element base 3 is composed of a protective layer 4 formed with silicon oxide, silicon nitride, silicon carbide or the like, electrodes 5 made of aluminum, gold, aluminum-copper alloy or the like, a heating resistor layer 6 formed with a high-melting material such as $HfB_2$, TaN or TaAl, a heat accumulating layer 7 formed with thermally oxidized silicon, aluminum oxide or the like, and a substrate 8 made of silicon, aluminum, aluminum nitride or the like having good heat radiating property. Incidentally, reference numerals 100 and 101 designate an optical waveguide and a lens for irradiation, respectively.

Now, upon application of electric pulse signals to the electrodes 5 in the head 1, the heating element base 3 rapidly generates heat at the region shown by h to form bubbles in an ink which is in contact with the surface of this region. A meniscus 10 of the ink is projected by the action of the pressure thus produced, and the ink is ejected through the nozzle 2 of the head to fly out of an ejection orifice 11 toward a recording medium 13 in the form of droplets 12.

FIG. 4 illustrates an appearance of a multi-head composed of an array of a number of heads as shown in FIG. 2. Incidentally, FIG. 2 is a cross-sectional view of the head taken along the flow path of the ink, and FIG. 3 is a cross-sectional view taken along line 3—3 in FIG. 2.

Figure 5:
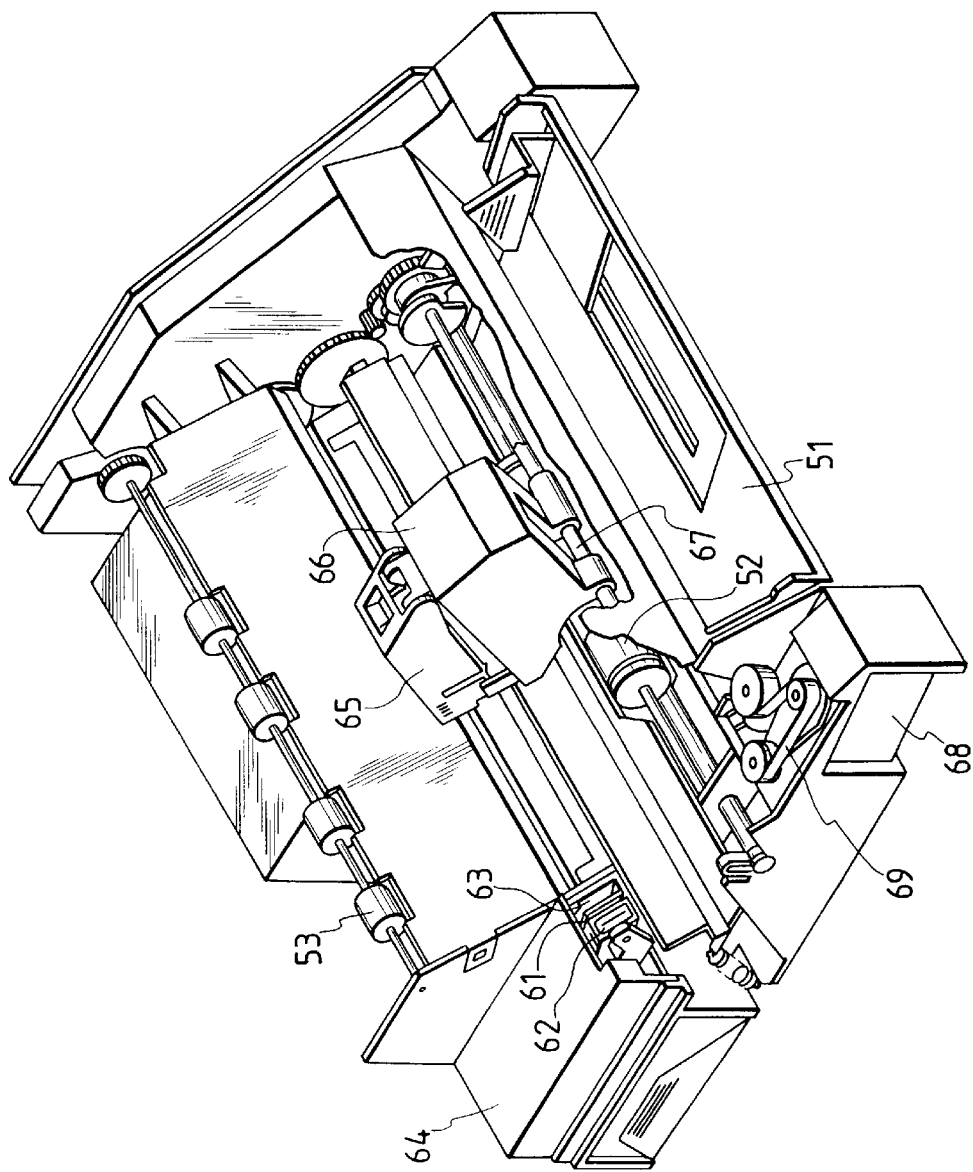
FIG. 5 is a perspective view illustrating an exemplary ink-jet recording apparatus.

FIG. 5 illustrates an example of an ink-jet recording apparatus in which such a head has been incorporated. In FIG. 5, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for a face of ejection openings of the recording head 65, which is provided at the home position adjacent to the blade 61, and is so constituted that it moves in the direction perpendicular to the direction in which the recording head 65 is moved and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved.

The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with ejection openings to conduct recording. Reference numeral 66 indicates a carriage on which the recording head 65 is mounted so that the recording head 65 can be moved.

The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numeral 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

Figure 6:
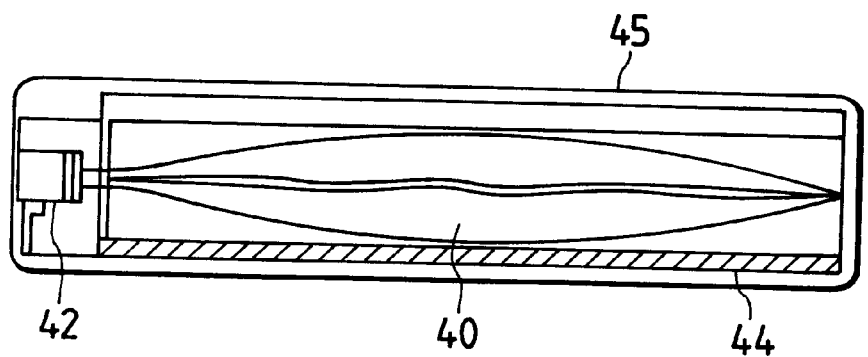
FIG. 6 is a longitudinal cross-sectional view illustrating an exemplary ink cartridge.

FIG. 6 illustrates an exemplary ink cartridge 45 in which an ink to be fed to the recording head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

It is preferred in the present invention that the ink container portion is formed of a polyolefin, in particular, polyethylene, at its surface with which the ink comes into contact.

The ink-jet recording apparatus used in the present invention are limited to the apparatus as described above in which the head and the ink cartridge are separately provided. Therefore, a device in which these members are integrally formed as shown in FIG. 7 can also be preferably used.

Figure 7:
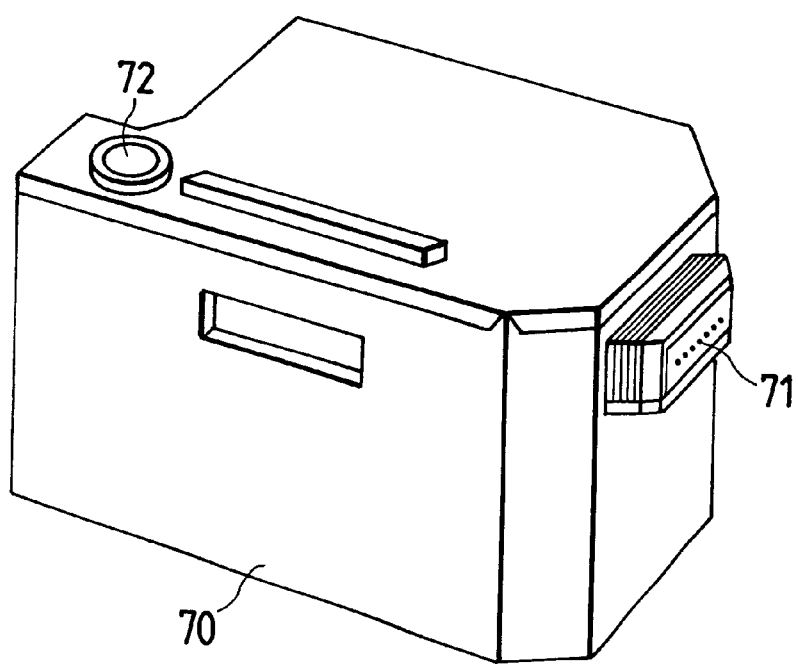
FIG. 7 is a perspective view of a recording unit in which an ink-jet recording head and an ink cartridge are integrally combined.

In FIG. 7, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices.

In the present invention, polyurethane is preferably used as a material for the ink-absorbing member. The recording unit 70 may be so constructed that the ink container portion is a bag for the ink in the interior of which a spring or the like is provided, not the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66.

As the second form of the ink-jet recording apparatus, may be mentioned an on-demand type ink-jet recording apparatus comprising a nozzle-forming base having a plurality of nozzles, pressure-generating elements composed of a piezoelectric material and an electrically conductive material provided in an opposing relation to the nozzles, and an ink filled around the pressure-generating elements, in which the pressure-generating elements are displaced by voltage applied to eject droplets of the ink from the nozzles.

Figure 8:
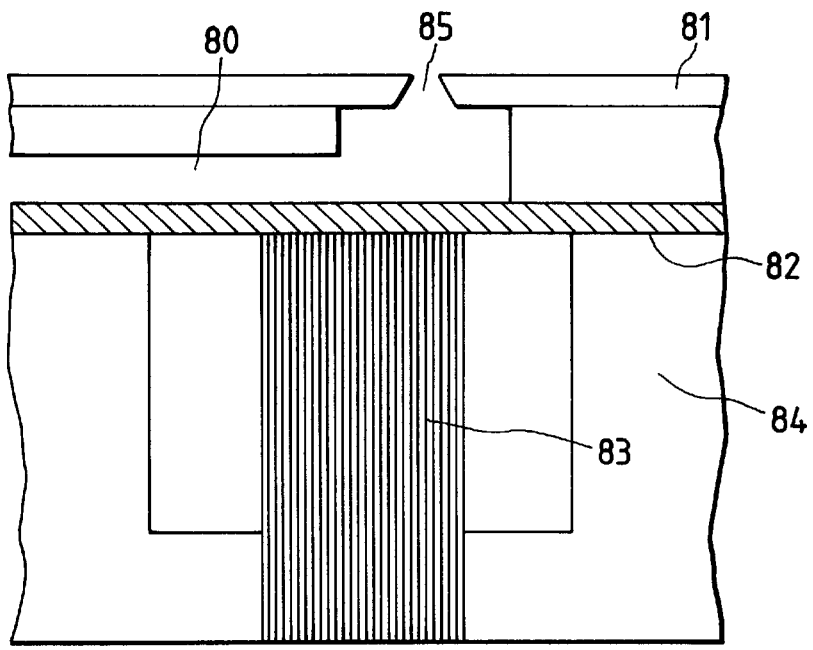
FIG. 8 is a longitudinal cross-sectional view of an ink-jet recording head using a piezoelectric element.

An example of the construction of a recording head, which is a main component of such a recording apparatus, is illustrated in FIG. 8.

The head is composed of an ink flow path 80 communicating with an ink chamber (not illustrated), an orifice plate 81 through which ink droplets having a desired volume are ejected, a vibration plate 82 directly applying a pressure to the ink, a piezoelectric element 83 bonded to the vibration plate 82 undergoing displacement according to an electric signal, and a substrate 84 adapted to support and fix the piezoelectric element 83, the orifice plate 81 and the vibration plate 82 thereon.

In FIG. 8, the ink flow path 80 is formed with a photosensitive resin or the like. The orifice plate 81 is made of a metal such as stainless steel or nickel, the ejection opening 85 of which is formed by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head of the above construction is operated in such a manner that pulsed voltage is applied to the piezoelectric element 83 to generate a stress to cause distortion, the vibration plate 82 bonded to the piezoelectric element 83 is deformed by the energy of the stress, and the ink in the ink flow path is thus perpendicularly pressurized to eject droplets of the ink from the ejection opening 85 of the orifice plate 81, thereby conducting recording.

Such a recording head is used by incorporating it into a recording apparatus similar to that illustrated in FIG. 5. Operation of details of the recording apparatus may be conducted in the same manner as described above.

An exemplary procedure for forming recorded images actually making good use of irradiation will be described.

Figure 10:
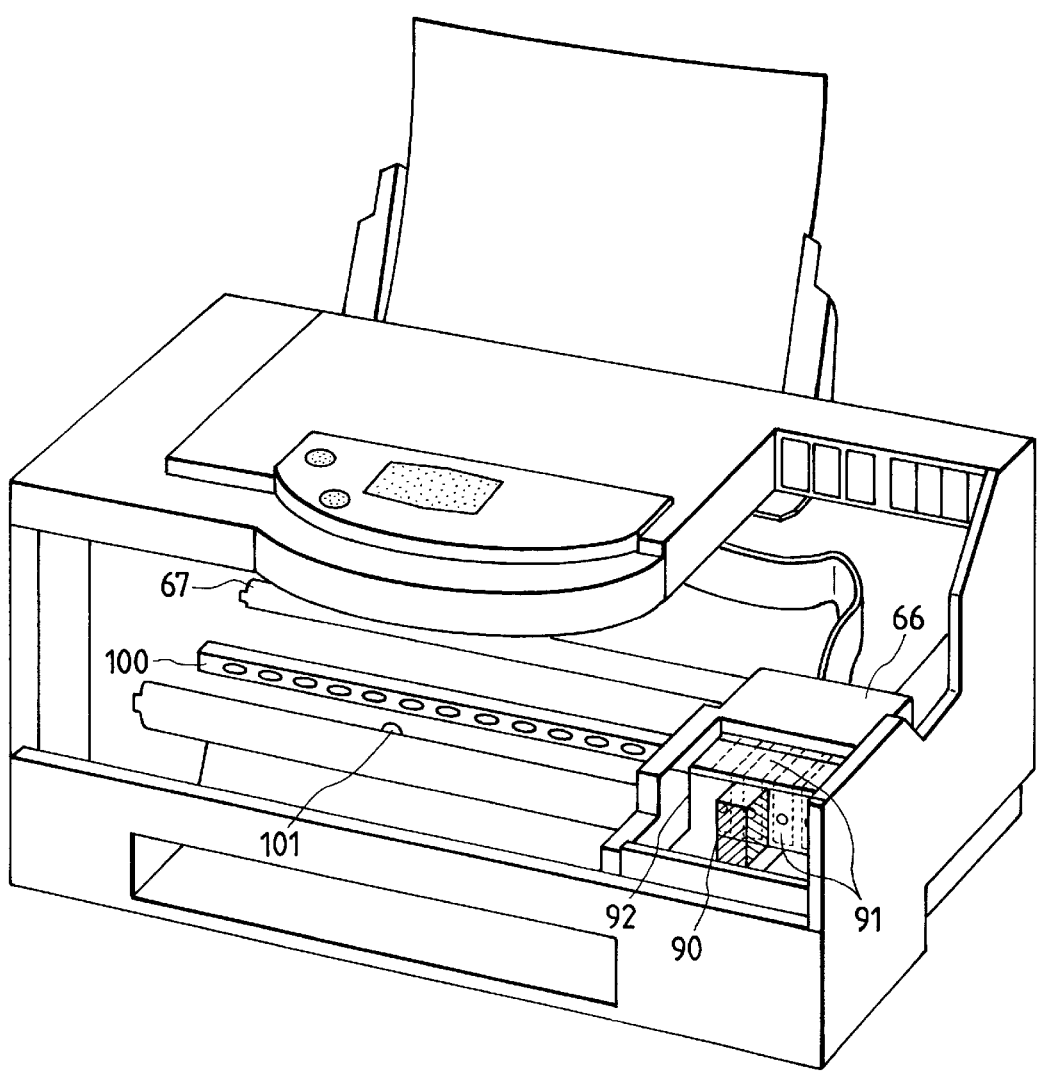
FIG. 10 is a perspective view illustrating an exemplary ink-jet recording apparatus equipped with an irradiating mechanism.

In a recording apparatus illustrated in FIG. 10 in which an irradiating mechanism is incorporated, a light source 100 is turned ON when the recording apparatus detects an image signal, so that a portion corresponding to a recording surface is exposed to light from the light source at the predetermined output in advance. When a light source monitor 101 detects the fact that the output of the light source has reached the predetermined value, recording paper is conveyed to a recording position. When a means for stopping a recording operation unless the recording paper is present at the position of a carriage guide shaft 67 to inform an operator of an error is provided in this apparatus, the reliability of the apparatus is increased. A recording head 91 for ink-jet on a carriage 66 then forms dots on the recording paper according to the image signal, during which the recording dots are being irradiated without interval. When the output of the light source is changed according to whether image signals are only character data of 2 bytes or a large amount of bit map signals like those in a photograph or illustration, recording can be conducted with always constant quality, so that higher-quality recording is feasible. When the final bit data right before all image signals for one page are recorded is detected, the light source 100 is turned OFF, whereby the apparatus is on standby for next recording. When continuous recording is conducted, namely, plural copies of the same image are recorded, or all images ranging over plural pages are recorded, the light source is not turned OFF in the intervals between the individual recording processes, but its output is controlled so as to be reduced to, for example, a fifth of that during recording, thereby obtaining effects such as reduction in consumed power and stabilization of the light source output. When recording is continuously conducted on a continuous form, it is preferable to keep the output of the light source constant during recording.

The present invention will hereinafter be described specifically by the following Examples and Comparative Examples. Incidentally, all designations of "compositional ratio(s)", "part(s)" and "%" as will be used in the following examples are by weight unless expressly noted.

First of all, the preparation of various inks according to the present invention will be described. Polymers exhibiting a heat-reversible type thickening property used in the following Examples are as shown in Table 1.

TABLE 1

| Heat-reversible type thickening polymers used in Examples | | | |
|---|---|---|---|
| | Kind of monomer | Mol. wt. | Trans. temp. (° C.) |
| A | 2-Morpholinoethyl methacrylate (98) Methacrylic acid (2) | 40,000 | 35 |
| B | 2-(2-Morpholinoethoxy) ethyl methacrylate | 10,000 | 46 |
| C | Morpholine ethylene oxide (3 mol) methyacrylate | 10,000 | 55 |
| D | Morpholine ethylene oxide (3 mol) methacrylate | 5,000 | 55 |
| E | 2-Morpholinoethyl methacrylate (70) Methoxytetraethylene glycol monomethacrylate (28) Methacrylic acid (2) | 40,000 | 35 |
| F | 2-Morpholinoethyl methacrylate (80) ω-Methoxypolyethylene glycol-polypropylene glycol-polyethylene glycol monomethacrylate* (18) Methacrylic acid (2) | 5,000 | 46 |
| G | N-Isopropylacrylamide | 20,000 | 32 |
| H | N-Acryloylpyrrolidine (93) Polyethylene glycol monomethacrylate** (5) Methacrylic acid (2) | 20,000 | 56 |

Heat-reversible type thickening polymers having a moiety capable of converting light into heat used in the following Examples are then described.

The polymers used in the present invention are vinyl-type polymers and hence obtained by mixing a monomer component with the desired photosensitizing coloring matter and conducting radical copolymerization. No particular limitation is imposed on the polymerization process, and a process such as solution polymerization, emulsion polymerization or suspension polymerization may be used. An example of synthesis will hereinafter be described.

After an aqueous solution containing 98 parts of 2-morpholinoethyl methacrylate and 2 parts of methacrylic acid as a monomer component was prepared, and 1.8 parts of sodium copper chlorophyllin (product of Wako Pure Chemical Industries Ltd.) as a photosensitizing coloring matter were mixed with the aqueous solution, 2.0 parts of ammonium persulfate as a polymerization initiator were added under a nitrogen atmosphere, thereby subjecting the monomer component to radical polymerization at 40° C. for 8 hours to obtain an intended polymer. Examples of the heat-reversible type thickening polymer having a photosensitizing coloring matter are given in Table 2.

TABLE 2

Heat-reversible type thickening polymers having a photosensitizing coloring matter used in Examples

| | Kind of monomer (Compositional ratio) | Photosensitizing coloring matter | Mol. wt. | Trans. temp. (° C.) |
|---|---|---|---|---|
| I | 2-Morpholinoethyl methacrylate (98) Methacrylic acid (2) | Sodium copper chlorophyllin (1.8) | 20,000 | 36 |
| J | 2-Morpholinoethyl methacrylate (70) Methoxytetraethylene glycol monomethacrylate (28) Methacrylic acid (2) | Sodium copper chlorophyllin (1.8) | 5,000 | 37 |
| K | N-Isopropylacrylamide | Sodium copper chlorophyllin (2.0) | 40,000 | 33 |

Inks according to the Examples and Comparative Examples were prepared by preparing a solution of each of the heat-reversible type thickening polymers in deionized water in a suitable concentration (5 to 10%) in advance and then following the following respective procedures.

EXAMPLES 1 TO 14 and

Comparative Examples 1 to 4

[1] Inks where dyes were used as coloring materials will first be described.

Deionized water, a photosensitizing coloring matter (omitted where the polymer used was a polymer shown in Table 2), a solvent, an aqueous solution of a dye and optionally a surfactant were added to the polymer solutions prepared in advance in that order with stirring to prepare compositions in their corresponding concentrations shown in Tables 3A and 3B. After stirring the compositions for 3 hours, they were filtered through a membrane filter having a pore size of 0.45 μm, thereby preparing black inks (Examples 1 to 11), a yellow ink (Y ink) (Example 12), a magenta ink (M ink) (Example 13) and a cyan ink (C ink) (Example 14) according to the present invention. Compositions of the inks according to Examples 1 to 11 (black inks) and Examples 12 to 14 (color inks) are shown in Tables 3A and 3B, respectively.

TABLE 3B

Compositions of color inks according to Examples 12 to 14 (unit: %)

| | Example | | |
|---|---|---|---|
| | 12 | 13 | 14 |
| C.I. Direct Yellow 86 | 2.0 | — | — |
| C.I. Direct Red 227 | — | 3.0 | — |
| C.I. Direct Blue 199 | — | — | 3.0 |
| 1,2-Ethanediol | 15.0 | 15.0 | 15.0 |
| 2-Propanol | 2.0 | 2.0 | 2.0 |
| Polymer Kind | A | E | J |
| Solid amount added | 5.0 | 5.0 | 8.0 |
| Photosensitizing coloring matter Kind | Sodium copper chlorophyllin | | — |
| Amount added | 0.1 | 0.1 | — |
| Deionized water | 75.9 | 74.9 | 72.0 |

As a comparative example, an ink was prepared in the same manner as in Example 1 except that neither the heat-reversible type thickening polymer nor the photosensitizing coloring matter was used, thereby providing it as a black ink of Comparative Example 1. Similarly, inks were prepared in the same manner as in Examples 12, 13 and 14 except that neither the heat-reversible type thickening polymer nor the photosensitizing coloring matter was used, thereby providing them as color inks of Comparative Examples 2, 3 and 4, respectively. In each comparative example, deionized water was additionally supplied by the amount of the heat-reversible type thickening polymer and photosensitizing coloring matter omitted.

EXAMPLE 15 and

Comparative Example 5

[2] An ink where a pigment was used as the second coloring material will now be described.

First of all, a pigment dispersion was prepared.

TABLE 3A

Compositions of black inks according to Examples 1 to 11 (unit: %)

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| C.I. Direct Black 19 | | 4.0 | 4.0 | 4.0 | 4.0 | 4.0 | 4.0 | 4.0 | 4.0 | 4.0 | 4.0 | 4.0 |
| 1,2-Ethanediol | | 15.0 | 15.0 | 15.0 | 15.0 | 15.0 | 15.0 | 15.0 | 15.0 | 15.0 | 15.0 | 15.0 |
| 2-Propanol | | 2.0 | 2.0 | 2.0 | 2.0 | 2.0 | 2.0 | 2.0 | 2.0 | 2.0 | 2.0 | 2.0 |
| Polymer | Kind | A | B | C | D | E | F | G | H | I | J | K |
| | Solid amount added | 5.0 | 8.0 | 8.0 | 10.0 | 5.0 | 10.0 | 5.0 | 5.0 | 10.0 | 5.0 | 5.0 |
| Photosensitizing coloring matter | Kind | Sodium copper chlorophyllin | | | | | | | | — | — | — |
| | Amount added | 0.2 | 0.5 | 0.5 | 0.7 | 0.2 | 0.7 | 0.2 | 0.2 | — | — | — |
| Deionized water | | 73.8 | 70.5 | 70.5 | 68.3 | 73.8 | 68.3 | 73.8 | 73.8 | 74.0 | 71.0 | 77.0 |

(Preparation of Pigment Dispersion)

| | |
|---|---|
| Styrene-ethyl acrylate copolymer (acid value: 150, molecular weight: 5,000) | 1.5 g |
| Monoethanolamine | 1.0 g |
| Diethylene glycol | 81.5 g |
| Deionized water | 5.0 g. |

The above components were mixed and heated to 70° C. on a water bath to completely dissolve the resin therein. Added to this solution were 10 g of carbon black (MCF 88, product of Mitsubishi Kagaku Co., Ltd.) and 1 g of 2-propanol and premixed for 30 minutes. Thereafter, the resulting premix was subjected to a dispersion treatment. A sand grinder (manufactured by Igarashi Kikai K.K.) was used as a grinder to conduct a grinding treatment for 3 hours under conditions that zirconium beads (diameter: 1 mm) were used as a grinding medium so as to give a packing rate of 50%. The thus-ground mixture was further subjected to a centrifugal treatment (12,000 rpm, 20 minutes) to remove coarse particles into a dispersion.

(Preparation of Ink)

An aqueous solution of Polymer A and a photosensitizing coloring matter were then added to the above-obtained dispersion, and other components were further added so as to give a composition shown below. The resultant composition was mixed for 2 hours, thereby preparing an ink according to Example 15.

| | |
|---|---|
| Pigment dispersion | 30% |
| Polymer A (solid concentration) | 5% |
| N-Methyl-2-pyrrolidone | 15% |
| Sodium copper chlorophyllin | 0.5% |
| Ethanol | 2% |
| Deionized water | 47.5%. |

As a comparative example, an ink was prepared in the same manner as in Example 15 except that neither the heat-reversible type thickening polymer nor the photosensitizing coloring matter was used, thereby providing it as an ink of Comparative Example 5. Incidentally, deionized water was additionally supplied in the amount of the heat-reversible type thickening polymer and photosensitizing coloring matter omitted.

EXAMPLES 16 AND 17
and

Comparative Examples 6 and 7

[3] Inks where fine coloring material particles were used as the third coloring material will be described.

(Preparation of Dispersion of Fine Coloring Material Particles)

First of all, a fine particle dispersion S2467N (product of Japan Synthetic Rubber Co., Ltd., solid content: 8.0%, pH: 8.0, particle diameter: 18 nm) was heated to 60° C., to which an aqueous solution of a dye (C.I. Direct Black 19, 10%) was added drop by drop with stirring. These components were mixed so as to give a final volume ratio of the dispersion S2467N to the aqueous solution of the dye of 3:1, and the resultant mixture was further stirred for 8 hours. The liquid mixture was subsequently filtered through a membrane filter having a pore size of 0.45 μm, thereby preparing a dispersion of fine coloring material particles.

(Preparation of Ink)

An aqueous solution of Polymer A, solvents and the like were then added to the above-obtained dispersion, and these components were mixed so as to give a composition shown below, thereby preparing an ink according to Example 16.

| | |
|---|---|
| Dispersion of fine coloring matter | 70% |
| Polymer A (solid concentration) | 5% |
| Sodium copper chlorophyllin | 0.5% |
| Dipropylene glycol monomethyl ether | 5% |
| Diethylene glycol | 10% |
| Deionized water | 9.5%. |

An aqueous solution of Polymer A, solvents and the like were then added to a mixture of the above-obtained dispersion of the fine coloring material particles and the pigment dispersion prepared in Example 15, and these components were mixed so as to give a composition shown below, thereby preparing an ink according to Example 17.

| | |
|---|---|
| Dispersion of fine coloring matter | 40% |
| Pigment dispersion | 20% |
| Polymer A (solid concentration) | 5% |
| Sodium copper chlorophyllin | 0.5% |
| Diethylene glycol | 15% |
| Deionized water | 19.5%. |

As comparative examples for the above examples, inks were prepared in the same manner as in Examples 16 and 17 except that neither the heat-reversible type thickening polymer nor the photosensitizing coloring matter was used, thereby providing them as inks of Comparative Examples 6 and 7, respectively. Incidentally, deionized water was additionally supplied in the amount of the heat-reversible type thickening polymer and photosensitizing coloring matter omitted.

[Evaluation]

With respect to the inks of Examples 1 to 17 and Comparative Examples 1 to 7, the performance as ink was evaluated.

Three performance items of (1) optical density (OD value), (2) resistance to feathering and (3) resistance to bleeding were evaluated. Each evaluation was conducted in an air-conditioned laboratory controlled at 23° C. and 60% RH. The evaluation methods of the respective items will hereinafter be described specifically.

(1) Optical Density (OD Value)

A pattern including 5 solid printed areas of 5 mm square was printed on an A4-sized paper sheet. After the resulting print sample was left standing for at least 30 minutes, its optical density was measured. The optical densities of the 5 solid printed areas were measured by a Macbeth reflection densitometer RD914, and their average value was taken as an OD value of the sample. Incidentally, the shot-in ink quantity at each solid printed area was 12 nl/mm$^2$.

(2) Resistance to Feathering

Dots were recorded on an A4-sized paper sheet with nozzles of a recording head thinned-out every other nozzle. After the thus-obtained print sample was left standing for at least 30 minutes, its dots were observed through a magnifier, and the resistance to feathering was evaluated in accordance with the following standard:

1: Dots had no round area;

2: Dots underwent feathering or deformation at three quarters of their circumference;

3: Dots underwent feathering or deformation at a half of their circumference;

4: Dots underwent feathering or deformation at a quarter of their circumference; and 5: Dots were round.

(3) Resistance to Bleeding

Figure 9:
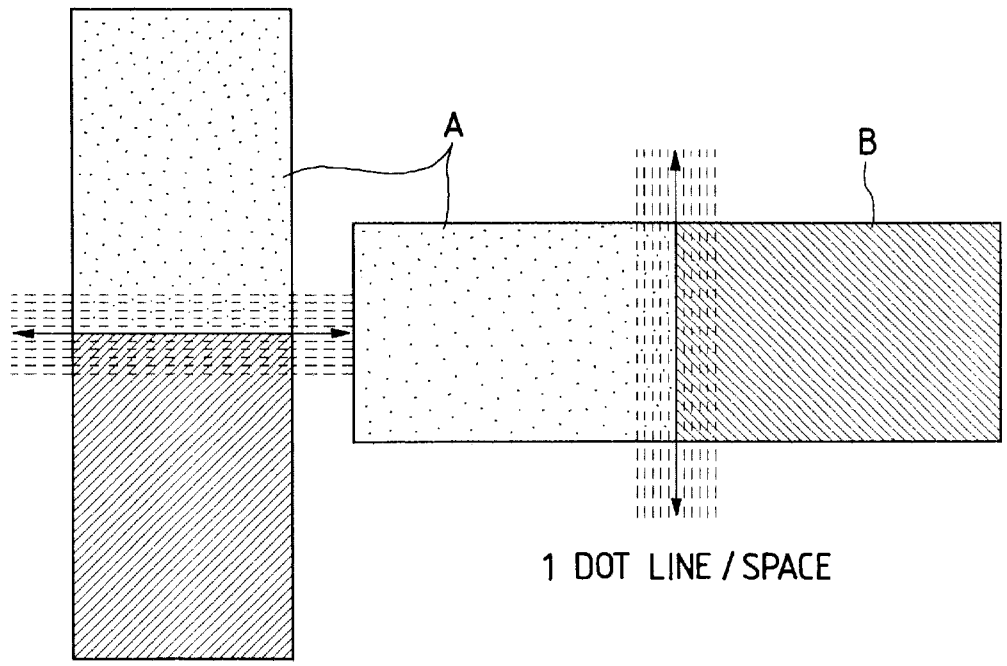
FIG. 9 illustrates a pattern for evaluating bleeding.

Following an evaluation pattern as illustrated in FIG. 9, images were formed with a color ink for the areas A (Color A) and a black ink for the areas B (Color B) to observe the position of a line, to which color mixing (bleeding) extended from a boundary line (a line with arrowheads at both ends in the drawing) between the two colors, to thereby evaluate the resistance to bleeding as a level of bleeding. The evaluation was performed in accordance with the following 5-rank standard. Incidentally, in FIG. 9, reference characters A and B indicate printed patterns of Colors A and B, respectively. The boundary line between the two colors was indicated by the line with arrowheads at both ends. Recording was conducted by 5 lines from the boundary line at intervals of 1 dot line/dot space.

1: Bleeding did not extend over 5 dot lines from the boundary line;

2: Bleeding did not extend over 4 dot lines from the boundary line;

3: Bleeding did not extend over 3 dot lines from the boundary line;

4: Bleeding did not extend over 2 dot lines from the boundary line; and

5: Bleeding did not extend over 1 dot line from the boundary line.

[Machine used in Evaluation]

As a recording apparatus for the above evaluation, a Bubble Jet Printer, BJC-600J (trade name, manufactured by Canon Inc.) illustrated in FIG. 10 was used. The supply of ink was conducted in accordance with a method in which the intended inks are filled in the respective special ink containers 90. Incidentally, a mechanism (a light source and a light transmitting part) for irradiating the ink applied during recording is incorporated into BJC-600J illustrated in FIG. 10. Reference numeral 100 indicates the light source (unit array), for example, a halogen lamp of 12 V and 10 W. Reference numeral 101 designates a light source monitor. Reference numeral 91 and 92 indicate an ink-jet recording head and a recording unit in which 4 recording heads 91 are integrally combined, respectively.

The evaluation was performed by applying a voltage pulse to the recording head 91 at voltage not ejecting an ink contained therein to keep the temperature of the ink at a temperature lower than the transition temperature of the heat-reversible type thickening polymer used by about 3° C. In such a state, a recording pulse was applied to eject droplets of the ink, and the ink applied to the surface of paper was exposed to light from the light source 100 to induce light-heat converting action, thereby conducting recording.

The inks of the comparative examples corresponding to the examples were also evaluated by conducting recording under conditions set in the same manner as in the inks of the examples. The evaluation of the above evaluation items (1), (2) and (3) was conducted with NP-SK paper (Lot No. OKK10) for electrophotography.

(Result of Evaluation)

In Table 4, are shown the results of the evaluation as to optical density [evaluation item (1)] and resistance to feathering [evaluation item (2)] of the inks according to the Examples and Comparative Examples. The results of the evaluation as to resistance to bleeding [evaluation item (3)], which was conducted by combining the inks of the Examples with each other, are shown in Table 5, and the results of the evaluation as to resistance to bleeding, which was conducted by combining the inks of the Comparative Examples with each other, are shown in Table 6.

TABLE 4

Evaluation results as to optical density and resistance to feathering (Examples and Comparative Examples)

| Ink | (1) Optical density (OD value) | (2) Resistance to feathering |
|---|---|---|
| Example 1 | 1.39 | 4 |
| Example 2 | 1.40 | 5 |
| Example 3 | 1.38 | 5 |
| Example 4 | 1.43 | 4 |
| Example 5 | 1.40 | 5 |
| Example 6 | 1.39 | 5 |
| Example 7 | 1.42 | 4 |
| Example 8 | 1.41 | 4 |
| Example 9 | 1.37 | 4 |
| Example 10 | 1.40 | 4 |
| Example 11 | 1.36 | 5 |
| Example 12 | 1.23 | 4 |
| Example 13 | 1.27 | 4 |
| Example 14 | 1.28 | 4 |
| Example 15 | 1.39 | 5 |
| Example 16 | 1.31 | 5 |
| Example 17 | 1.38 | 5 |
| Comparative Example 1 | 1.20 | 2 |
| Comparative Example 2 | 1.08 | 3 |
| Comparative Example 3 | 1.02 | 2 |
| Comparative Example 4 | 1.05 | 2 |
| Comparative Example 5 | 1.10 | 3 |
| Comparative Example 6 | 1.12 | 3 |
| Comparative Example 7 | 1.15 | 3 |

TABLE 5

Evaluation results as to resistance to bleeding (Examples)

| Bk ink | Y ink Example 12 | M ink Example 13 | C ink Example 14 |
|---|---|---|---|
| Example 1 | 5 | 5 | 4 |
| Example 5 | 5 | 5 | 4 |
| Example 7 | 5 | 5 | 5 |
| Example 9 | 5 | 5 | 5 |
| Example 10 | 4 | 4 | 4 |
| Example 11 | 4 | 5 | 4 |
| Example 15 | 4 | 5 | 4 |
| Example 16 | 4 | 5 | 4 |
| Example 17 | 4 | 5 | 4 |

TABLE 6

Evaluation results as to resistance to bleeding (Comparative Examples)

| Bk ink | Y ink Comparative Example 2 | M ink Comparative Example 3 | C ink Comparative Example 4 |
|---|---|---|---|
| Comparative Example 1 | 1 | 2 | 3 |
| Comparative Example 5 | 1 | 2 | 3 |

TABLE 6-continued

Evaluation results as to resistance to bleeding
(Comparative Examples)

| Bk ink | Y ink Comparative Example 2 | M ink Comparative Example 3 | C ink Comparative Example 4 |
|---|---|---|---|
| Comparative Example 6 | 1 | 2 | 2 |
| Comparative Example 7 | 1 | 3 | 2 |

As is apparent from the evaluation results shown in Table 4, the inks according to the present invention have excellent resistance to feathering compared with the conventional inks while maintaining high optical density. Besides, with respect to resistance to bleeding, as apparent from the evaluation results shown in Tables 5 and 6, the inks according to the present invention have a great effect of preventing color mixing owing to their rapid increase in viscosity on the surface of paper. Therefore, it may safely be said that the inks markedly exhibit an effect of preventing the occurrence of bleeding.

It is understood that the inks according to the present invention can achieve high color strength and have excellent effects of preventing the occurrence of feathering and bleeding, in particular, in color recording on plain paper for offices, such as paper for electrophotography.

Since the inks according to the present invention undergo a change of state only by temperature change, they are not affected by the surface pH, irregularities and the like of recording media. Therefore, they are useful for various recording media such as transparent films, cloths and metal sheets in addition to the plain paper.

As described above, the means for forming images with the inks according to the present invention do not depend on only evaporation and penetration, and so the problems of feathering and bleeding, which must be referred to upon high-quality recording, can also be solved at the same time while providing a high optical density.

Further, the present invention has such effects as consumed power can be reduced because mechanisms additionally provided for improving recordability are extremely simple.

The inks according to the present invention markedly exhibit the above effects when they are used in combination with ink-jet recording apparatus, in particular, with those making good use of thermal energy or mechanical energy as an ink-jet recording system.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A water-based ink for ink-jet recording, containing a coloring material, a liquid medium, a polymer exhibiting a heat-reversible thickening property, and a compound having a light-to-heat converting function, wherein when the ink is exposed to visible light, the compound generates heat sufficient to cause the polymer to aggregate, thereby to increase a viscosity of the ink.

2. The water-based ink according to claim 1, wherein the compound having a light-to-heat converting function is a photosensitizing coloring matter.

3. The water-based ink according to claim 2, wherein the photosensitizing coloring matter absorbs visible light and emits heat sufficient to change the polymer's heat-reversible thickening property.

4. The water-based ink according to claim 2, wherein the photosensitizing coloring matter is a compound selected from the group consisting of indigo photosensitizing coloring matters, porphyrin photosensitizing coloring matters, xanthen photosensitizing coloring matters, thiazine photosensitizing coloring matters, chlorophyll photosensitizing coloring matters and quinone photosensitizing coloring matters.

5. The water-based ink according to claim 2, wherein the photosensitizing coloring matter has at least one of the following structures:

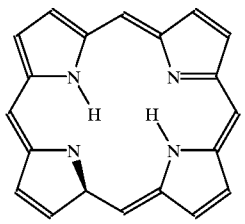

(porphyrin)

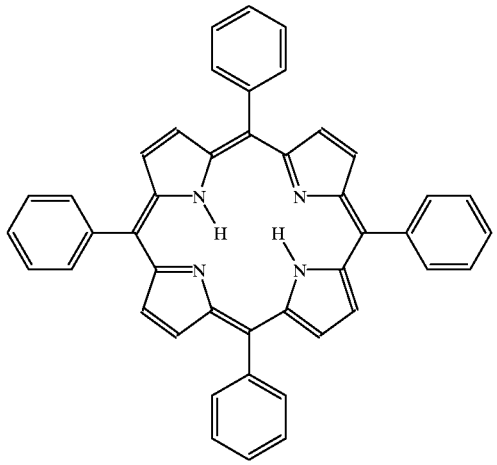

(tetraphenylporphyrin)

-continued

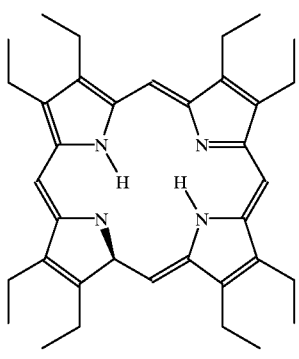

(octaethylporphyrin)

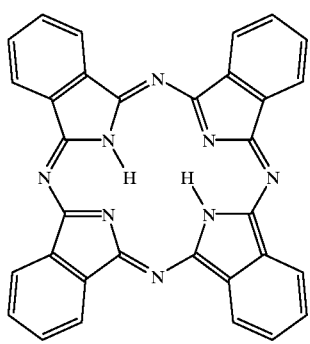

(phthalocyanine)

and

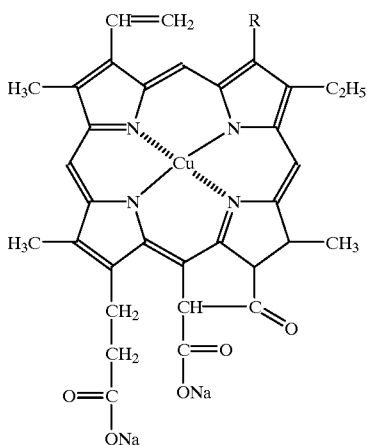

(copper chlorophyllin a sodium salt R: CH₃
copper chlorophyllin b sodium salt R: CHO).

6. The water-based ink according to claim 1, wherein the polymer exhibiting a heat-reversible thickening property comprises a water-soluble polymer having a clouding point or a water-soluble vinyl polymer (A) comprising at least 50% by weight of a vinylcarboxylic ester (a) of an alkylene oxide adduct of an active hydrogen compound having a nitrogen-containing ring as a constituent unit.

7. The water-based ink according to claim 6, wherein the vinylcarboxylic ester (a) is the (meth)acrylic ester of an adduct of (substituted) morpholine with 1 to 20 moles of ethylene oxide and/or propylene oxide.

8. The water-based ink according to claim 6, wherein the polymer exhibiting a heat-reversible thickening property is contained in an amount of from 0.005 to 20% by weight in the ink.

9. The water-based ink according to claim 1, wherein the polymer exhibiting a heat-reversible thickening property is a polymer obtained by copolymerizing a monomer composition comprising at least 50% by weight in total of a vinylcarboxylic ester (a) of an alkylene oxide adduct of an active hydrogen compound having a nitrogen-containing ring, and a monomer represented by the general formula

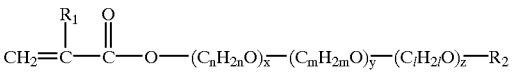

wherein $R_1$ is H or $CH_3$, $R_2$ is H, an alkyl group having 1 to 30 carbon atoms, an (alkyl)phenyl group or an (alkyl-substituted) aminoalkyl group, n is an integer of 2 to 4, m is an integer of 2 to 4, l is an integer of 2 to 4, x is an integer of 2 to 50, y is an integer of 0 to 50, and z is an integer of 0 to 50, with the proviso that n, m and l are not the same integers, and n and m, or m and l are not the same integers.

10. The water-based ink according to claim 9, wherein the vinylcarboxylic ester (a) is the (meth)acrylic ester of an adduct of (substituted) morpholine with 1 to 20 moles of ethylene oxide and/or propylene oxide.

11. The water-based ink according to claim 9, wherein the polymer exhibiting a heat-reversible thickening property is contained in an amount of from 0.005 to 20% by weight in the ink.

12. The water-based ink according to claim 1, wherein the coloring material is a dye and is contained in an amount of from 0.01 to 10% by weight in the ink.

13. The water-based ink according to claim 1, wherein the coloring material is carbon black or an organic pigment.

14. The water-based ink according to claim 1, wherein the coloring material is fine coloring material particles in which a dye is bonded to the surfaces of fine particles to make the dye insoluble.

15. The water-based ink according to claim 1, wherein the coloring material is a mixture of at least two coloring materials selected from the group consisting of a dye, carbon black, an organic pigment and fine coloring material particles in which a dye is bonded to the surface of fine particles to make the dye insoluble.

16. A water-based ink for ink-jet recording, containing a coloring material, a liquid medium, and a polymer which exhibits a heat-reversible thickening property and which has a functional group that undergoes light-to-heat conversion which, when the ink is exposed to visible light, generates heat sufficient to cause the polymer to aggregate, thereby to increase a viscosity of the ink.

17. The water-based ink according to claim 16, wherein the functional group that undergoes light-to-heat conversion is a photosensitizing coloring matter.

18. The water-based ink according to claim 17, wherein the photosensitizing coloring matter absorbs visible light and emits heat sufficient to change the polymer's heat-reversible thickening property.

19. The water-based ink according to claim 17, wherein the photosensitizing coloring matter is a compound selected from the group consisting of indigo photosensitizing coloring matters, porphyrin photosensitizing coloring matters, xanthene photosensitizing coloring matters, thiazine photosensitizing coloring matters, chlorophyll photosensitizing coloring matters and quinone photosensitizing coloring matters.

20. The water-based ink according to claim 19, wherein the photosensitizing coloring matter has at least one of the following structures:

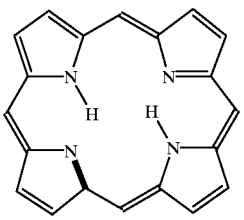

(porphyrin)

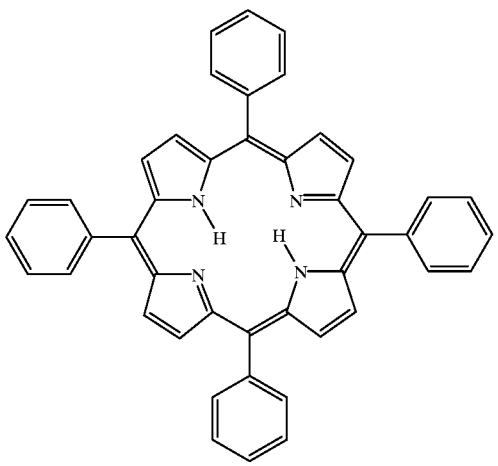

(tetraphenylporphyrin)

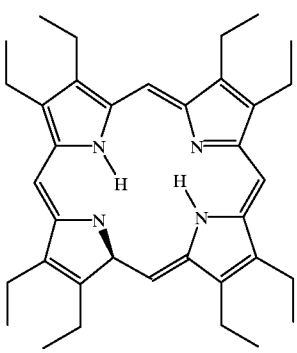

(octaethylporphyrin)

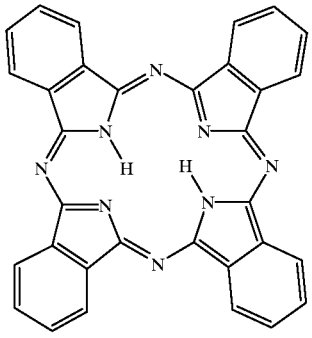

(phthalocyanine)

and

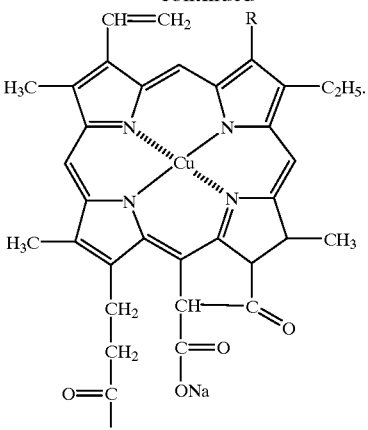

(copper chlorophyllin a sodium salt R: CH$_3$
copper chlorophyllin b sodium salt R: CHO)

21. The water-based ink according to claim 16, wherein the polymer which exhibits a heat-reversible thickening property and has a functional group that undergoes light-to-heat conversion is a water-soluble polymer having a clouding point to which a photosensitive coloring matter is bound, or a water-soluble vinyl polymer (A) comprising at least 50% by weight of a vinylcarboxylic ester (a) of an alkylene oxide adduct of an active hydrogen compound having a nitrogen-containing ring, to which a photosensitizing coloring matter is bound.

22. The water-based ink according to claim 21, wherein the vinylcarboxylic ester (a) is the (meth)acrylic ester of an adduct of (substituted) morpholine with 1 to 20 moles of ethylene oxide and/or propylene oxide.

23. The water-based ink according to claim 21, wherein the polymer which exhibits a heat-reversible thickening property and has a functional group that undergoes light-to-heat conversion is contained in an amount of from 0.005 to 20% by weight in the ink.

24. The water-based ink according to claim 16, wherein the polymer which exhibits a heat-reversible thickening property and has a functional group that undergoes light-to-heat conversion is a polymer obtained by copolymerizing a monomer composition comprising at least 50% by weight in total of a vinylcarboxylic ester (a) of an alkylene oxide adduct of an active hydrogen compound having a nitrogen-containing ring, and a monomer represented by the general formula (I)

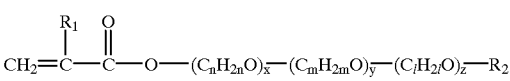

wherein $R_1$ is H or CH$_3$, $R_2$ is H, an alkyl group having 1 to 30 carbon atoms, an (alkyl)phenyl group or an (alkyl-substituted) aminoalkyl group, n is an integer of 2 to 4, m is an integer of 2 to 4, l is an integer of 2 to 4, x is an integer of 2 to 50, y is an integer of 0 to 50, and z is an integer of 0 to 50, with the proviso that n, m and l are not the same integers, and n and m, or m and l are not the same integers, and a photosensitizing coloring matter is bound to the polymer as the functional group.

25. The water-based ink according to claim 24, wherein the vinylcarboxylic ester (a) is the (meth)acrylic ester of an adduct of (substituted) morpholine with 1 to 20 moles of ethylene oxide and/or propylene oxide.

26. The water-based ink according to claim 24, wherein the polymer which exhibits a heat-reversible thickening property and has a functional group that undergoes light-to-heat conversion is contained in an amount of from 0.005 to 20% by weight in the ink.

27. The water-based ink according to claim 16, wherein the coloring material is a dye and is contained in an amount of from 0.01 to 10% by weight in the ink.

28. The water-based ink according to claim 16, wherein the coloring material is carbon black or an organic pigment.

29. The water-based ink according to claim 16, wherein the coloring material is fine coloring material particles in which a dye is bonded to the surfaces of fine particles to make the dye insoluble.

30. The water-based ink according to claim 16, wherein the coloring material is a mixture of at least two coloring materials selected from the group consisting of a dye, carbon black, an organic pigment and fine coloring material particles in which a dye is bonded to the surface of fine particles to make the dye insoluble.

31. An ink-jet recording method comprising a step of ejecting an ink according to claim 1 or 16, from an orifice of a recording head in accordance with recording signals.

32. The ink-jet recording method according to claim 31, wherein the recording head is kept at a temperature not higher than a transition temperature of the ink during the recording.

33. The ink-jet recording method according to claim 31, wherein the step comprises a sub-step of applying thermal energy to the ink to eject the ink.

34. The ink-jet recording method according to claim 31, wherein the step comprises a sub-step of applying mechanical energy to the ink to eject the ink.

35. A recording unit comprising an ink container portion containing an ink according to claim 1 or 16 therein and a recording head from which the ink is ejected in accordance with recording signals.

36. An ink-jet recording apparatus comprising a recording unit equipped with an ink container portion containing an ink according to claim 1 or 16 therein and a recording head from which the ink is ejected in accordance with recording signals.

37. The ink-jet recording apparatus according to claim 36, further comprising an irradiating mechanism for irradiating the ink ejected from the recording head.

38. The ink-jet recording apparatus according to claim 37, wherein the irradiating mechanism for irradiating the ink is integrated into the recording unit.

* * * * *

UNITED STATES PATENT AND TRADEMARK OFFICE
CERTIFICATE OF CORRECTION

PATENT NO. : 6,372,818 B1
DATED : April 16, 2002
INVENTOR(S) : Isao Kimura et al.

It is certified that error appears in the above-identified patent and that said Letters Patent is hereby corrected as shown below:

Column 3,
Line 65, "an" should read -- a --.

Column 12,
Line 10, "is." should read -- is --.

Column 26,
Line 20, "xanthen" should read -- xanthene --.

Signed and Sealed this

Eleventh Day of June, 2002

Attest:

Attesting Officer

JAMES E. ROGAN
Director of the United States Patent and Trademark Office